United States Patent
Kumar

(10) Patent No.: US 11,943,630 B2
(45) Date of Patent: Mar. 26, 2024

(54) ENHANCEMENTS FOR MULTIPLE RADIO PROTOCOL DYNAMIC SPECTRUM SHARING

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 225 days.

(21) Appl. No.: 17/179,564

(22) Filed: Feb. 19, 2021

(65) Prior Publication Data

US 2021/0266753 A1 Aug. 26, 2021

Related U.S. Application Data

(60) Provisional application No. 62/980,014, filed on Feb. 21, 2020.

(51) Int. Cl.
| | |
|---|---|
| *H04W 16/14* | (2009.01) |
| *H04W 28/02* | (2009.01) |
| *H04W 60/00* | (2009.01) |
| *H04W 72/0453* | (2023.01) |
| *H04W 76/12* | (2018.01) |
| *H04W 76/15* | (2018.01) |

(52) U.S. Cl.
CPC ....... *H04W 16/14* (2013.01); *H04W 28/0252* (2013.01); *H04W 60/005* (2013.01); *H04W 72/0453* (2013.01); *H04W 76/12* (2018.02); *H04W 76/15* (2018.02)

(58) Field of Classification Search
CPC ..... H04W 72/04; H04W 88/08; H04W 76/00; H04W 16/14; H04W 60/005; H04W 76/12; H04W 76/15; H04W 72/0453; H04W 28/0252

See application file for complete search history.

(56) References Cited

U.S. PATENT DOCUMENTS

| | | | | |
|---|---|---|---|---|
| 6,144,654 A | * | 11/2000 | Ibanez-Meier | ........ H04B 7/216 370/479 |
| 9,374,746 B1 | * | 6/2016 | Karabinis | ............ H04B 17/102 |

(Continued)

*Primary Examiner* — Michael J Moore, Jr.
*Assistant Examiner* — Prenell P Jones
(74) *Attorney, Agent, or Firm* — Holland & Hart LLP

(57) ABSTRACT

Methods, systems, and devices for wireless communications are described. Some wireless communications systems may support dynamic spectrum sharing for multiple radio protocols, such as New Radio and Long Term Evolution. Systems may implement a number of techniques to improve spectrum use by user equipment in dynamically shared frequency spectrums. In some aspects, the network may assign a user equipment to a specific bandwidth part based on a rate matching capability of the user equipment. Additionally or alternatively, the network may activate a specific bandwidth part based on the frequency of handover for a user equipment. In some aspects, the network may support dual registration (e.g., registration in a same frequency spectrum using different radio protocols) for a user equipment operating on a dynamically shared spectrum. To reduce the control overhead for such a user equipment, the network may use a single control channel to schedule data for multiple radio protocols.

28 Claims, 19 Drawing Sheets

(56) References Cited

U.S. PATENT DOCUMENTS

| | | | |
|---|---|---|---|
| 10,666,369 B2* | 5/2020 | Halozan | H04H 60/07 |
| 2010/0165931 A1* | 7/2010 | Nimbalker | H04L 1/1671 |
| | | | 370/329 |
| 2012/0281593 A1* | 11/2012 | Stewart | H04W 16/14 |
| | | | 370/259 |
| 2013/0208587 A1* | 8/2013 | Bala | H04W 72/0446 |
| | | | 370/278 |
| 2013/0301609 A1* | 11/2013 | Smith | H04W 72/0493 |
| | | | 370/329 |
| 2014/0204854 A1* | 7/2014 | Freda | H04L 5/0092 |
| | | | 370/329 |
| 2014/0335883 A1* | 11/2014 | Ericson | H04L 5/0053 |
| | | | 455/452.2 |
| 2017/0055197 A1* | 2/2017 | Shukair | H04W 36/30 |
| 2018/0160456 A1* | 6/2018 | Maheshwari | H04W 72/0446 |
| 2018/0176900 A1* | 6/2018 | Rong | H04W 28/0247 |
| 2018/0270722 A1* | 9/2018 | Kim | H04W 36/08 |
| 2019/0116582 A1* | 4/2019 | Pelletier | H04W 72/23 |
| 2020/0059796 A1* | 2/2020 | Ghosh | H04W 16/10 |
| 2020/0089811 A1* | 3/2020 | Liu | G06F 3/0482 |
| 2020/0145169 A1* | 5/2020 | Zhou | H04W 76/27 |
| 2020/0344832 A1* | 10/2020 | Hu | H04W 72/0453 |
| 2021/0084549 A1* | 3/2021 | Nam | H04W 36/0077 |
| 2021/0136554 A1* | 5/2021 | Kim | H04W 76/27 |
| 2021/0410107 A1* | 12/2021 | Park | H04W 76/27 |
| 2022/0225333 A1* | 7/2022 | Liu | H04W 72/23 |

\* cited by examiner

Control Channel

ENHANCEMENTS FOR MULTIPLE RADIO PROTOCOL DYNAMIC SPECTRUM SHARING

CROSS REFERENCE

The present application for patent claims the benefit of U.S. Provisional Patent Application No. 62/980,014 by KUMAR, entitled "ENHANCEMENTS FOR MULTIPLE RADIO PROTOCOL DYNAMIC SPECTRUM SHARING," filed Feb. 21, 2020, assigned to the assignee hereof, and expressly incorporated by reference herein.

FIELD OF TECHNOLOGY

The following relates generally to wireless communications and more specifically to enhancements for multiple radio protocol dynamic spectrum sharing (DSS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may implement dynamic spectrum sharing (DSS) between radio protocols (e.g., radio access technologies (RATs)) in the time and/or frequency domain. In some cases, DSS may support dynamic downlink spectrum sharing for LTE and NR traffic. DSS may allow for effective load balancing, especially to support heavy LTE traffic while NR is gradually deployed. However, reusing the frequency spectrum between LTE and NR may be complex. Simply implementing DSS across the frequency spectrum may lead to inefficient spectrum usage and nonoptimal throughput for one or more UEs. Further, in some cases, fallback operations from NR to LTE in a dynamically shared spectrum may lead to significant latency in UE communications.

SUMMARY

The present disclosure relates to methods, systems, devices, and apparatuses that support enhancements for multiple radio protocol dynamic spectrum sharing (DSS). Generally, the described techniques provide for improved spectrum use by user equipments (UEs) operating in a frequency spectrum dynamically shared between radio protocols (e.g., radio access technologies (RATs)), such as New Radio (NR) and Long Term Evolution (LTE). In some cases, a network implementing DSS for NR and LTE may assign a UE to a specific bandwidth part (BWP) based on a rate matching capability of the UE. In one aspect, the network may configure a first subset of BWPs in the frequency spectrum as dedicated for NR and second subset of BWPs in the frequency spectrum for DSS between NR and LTE, where the network may determine a BWP to activate for a UE based on the UE's rate matching capability. Additionally or alternatively, the network may switch a UE from one BWP to another based on a frequency of handover for the UE. In some aspects, the network may support dual registration (e.g., registration in a same frequency spectrum using different radio protocols, such as NR and LTE) for a UE operating in a dynamically shared spectrum. To reduce the control overhead for such a UE, the network may use a single control channel (e.g., an NR control channel) to schedule data for both NR and LTE.

A method for wireless communications implemented by a base station is described. The method may include configuring a set of BWPs such that a first subset of the set of BWPs is dedicated for a first RAT and a second subset of the set of BWPs is dynamically shared between the first RAT and a second RAT, receiving, from a UE, an indication of a rate matching capability of the UE, activating, for the UE, a BWP of the set of BWPs for communication based on the rate matching capability of the UE and the configuring, and transmitting, to the UE, an indication of the activated BWP for communication.

An apparatus for wireless communications implemented by a base station is described. The apparatus may include a processor, memory coupled with the processor, and instructions stored in the memory. The instructions may be executable by the processor to cause the apparatus to configure a set of BWPs such that a first subset of the set of BWPs is dedicated for a first RAT and a second subset of the set of BWPs is dynamically shared between the first RAT and a second RAT, receive, from a UE, an indication of a rate matching capability of the UE, activate, for the UE, a BWP of the set of BWPs for communication based on the rate matching capability of the UE and the configuring, and transmit, to the UE, an indication of the activated BWP for communication.

Another apparatus for wireless communications implemented by a base station is described. The apparatus may include means for configuring a set of BWPs such that a first subset of the set of BWPs is dedicated for a first RAT and a second subset of the set of BWPs is dynamically shared between the first RAT and a second RAT, receiving, from a UE, an indication of a rate matching capability of the UE, activating, for the UE, a BWP of the set of BWPs for communication based on the rate matching capability of the UE and the configuring, and transmitting, to the UE, an indication of the activated BWP for communication.

A non-transitory computer-readable medium storing code for wireless communications implemented by a base station is described. The code may include instructions executable by a processor to configure a set of BWPs such that a first subset of the set of BWPs is dedicated for a first RAT and a second subset of the set of BWPs is dynamically shared between the first RAT and a second RAT, receive, from a UE, an indication of a rate matching capability of the UE, activate, for the UE, a BWP of the set of BWPs for communication based on the rate matching capability of the UE and the configuring, and transmit, to the UE, an indication of the activated BWP for communication.

In some aspects of the method, apparatuses, and non-transitory computer-readable medium described herein, the indication of the rate matching capability of the UE indicates an absence of support for rate matching with a cell-specific reference signal (CRS) for the second RAT and the activating further may include operations, features, means, or instructions for activating, for the UE, the BWP from the first subset of the set of BWPs based on the absence of support for rate matching with the CRS for the second RAT.

In some aspects of the method, apparatuses, and non-transitory computer-readable medium described herein, the indication of the rate matching capability of the UE indicates support for rate matching with a CRS for the second RAT and the activating further may include operations, features, means, or instructions for activating, for the UE, the BWP from the second subset of the set of BWPs based on the UE supporting the rate matching with the CRS for the second RAT.

In some aspects of the method, apparatuses, and non-transitory computer-readable medium described herein, the first RAT may be a fifth generation (5G) NR technology, and the second RAT may be an LTE technology.

Some aspects of the method, apparatuses, and non-transitory computer-readable medium described herein may further include operations, features, means, or instructions for receiving, from a set of additional UEs, a set of additional indications of rate matching capabilities for the set of additional UEs and performing a load balancing calculation for the UE and the set of additional UEs across the set of BWPs, where the activating the BWP of the set of BWPs for communication may be further based on the load balancing calculation.

In some aspects of the method, apparatuses, and non-transitory computer-readable medium described herein, the activated BWP for communication may be a first BWP of the set of BWPs and the method, apparatuses, and non-transitory computer-readable medium described herein may further include operations, features, means, or instructions for switching the UE from the first BWP to a second BWP of the set of BWPs different from the first BWP based on an average throughput for the UE.

In some aspects of the method, apparatuses, and non-transitory computer-readable medium described herein, the switching further may include operations, features, means, or instructions for periodically switching the UE between the first BWP and the second BWP.

Some aspects of the method, apparatuses, and non-transitory computer-readable medium described herein may further include operations, features, means, or instructions for communicating with the UE in the activated BWP for communication.

A method for wireless communications implemented by a base station is described. The method may include communicating with a UE in a first BWP of a set of BWPs dedicated for a first RAT, identifying that the UE performs a number of handover procedures greater than a threshold number of handover procedures while communicating in the first BWP, switching, based on the identifying, the UE from the first BWP to a second BWP of the set of BWPs different from the first BWP and dynamically shared between the first RAT and a second RAT, and transmitting, to the UE, an indication of the second BWP for communication based on the switching.

An apparatus for wireless communications implemented by a base station is described. The apparatus may include a processor, memory coupled with the processor, and instructions stored in the memory. The instructions may be executable by the processor to cause the apparatus to communicate with a UE in a first BWP of a set of BWPs dedicated for a first RAT, identify that the UE performs a number of handover procedures greater than a threshold number of handover procedures while communicating in the first BWP, switch, based on the identifying, the UE from the first BWP to a second BWP of the set of BWPs different from the first BWP and dynamically shared between the first RAT and a second RAT, and transmit, to the UE, an indication of the second BWP for communication based on the switching.

Another apparatus for wireless communications implemented by a base station is described. The apparatus may include means for communicating with a UE in a first BWP of a set of BWPs dedicated for a first RAT, identifying that the UE performs a number of handover procedures greater than a threshold number of handover procedures while communicating in the first BWP, switching, based on the identifying, the UE from the first BWP to a second BWP of the set of BWPs different from the first BWP and dynamically shared between the first RAT and a second RAT, and transmitting, to the UE, an indication of the second BWP for communication based on the switching.

A non-transitory computer-readable medium storing code for wireless communications implemented by a base station is described. The code may include instructions executable by a processor to communicate with a UE in a first BWP of a set of BWPs dedicated for a first RAT, identify that the UE performs a number of handover procedures greater than a threshold number of handover procedures while communicating in the first BWP, switch, based on the identifying, the UE from the first BWP to a second BWP of the set of BWPs different from the first BWP and dynamically shared between the first RAT and a second RAT, and transmit, to the UE, an indication of the second BWP for communication based on the switching.

In some aspects of the method, apparatuses, and non-transitory computer-readable medium described herein, the switching further may include operations, features, means, or instructions for switching the UE from a first cell (e.g., of a first carrier) supporting the first BWP dedicated for the first RAT in a first frequency band to a second cell (e.g., of a second carrier) supporting the second BWP dynamically shared between the first RAT and the second RAT in a second frequency band that may be different from the first frequency band.

In some aspects of the method, apparatuses, and non-transitory computer-readable medium described herein, the first RAT may be a 5G NR technology and the second RAT may be an LTE technology.

A method for wireless communications implemented by a UE is described. The method may include registering, with a base station, on a first cell supporting a first RAT in a frequency spectrum, registering, with the base station, on a second cell supporting a second RAT different from the first RAT and at least partially overlapping with the first cell in the frequency spectrum based on the base station supporting dynamic sharing of the frequency spectrum between the first RAT and the second RAT, and communicating with the base station based on the registering on the first cell supporting the first RAT and the registering on the second cell supporting the second RAT.

An apparatus for wireless communications implemented by a UE is described. The apparatus may include a processor, memory coupled with the processor, and instructions stored in the memory. The instructions may be executable by the processor to cause the apparatus to register, with a base station, on a first cell supporting a first RAT in a frequency spectrum, register, with the base station, on a second cell supporting a second RAT different from the first RAT and at least partially overlapping with the first cell in the frequency spectrum based on the base station supporting dynamic sharing of the frequency spectrum between the first RAT and the second RAT, and communicate with the base station based on the registering on the first cell supporting the first RAT and the registering on the second cell supporting the second RAT.

Another apparatus for wireless communications implemented by a UE is described. The apparatus may include means for registering, with a base station, on a first cell supporting a first RAT in a frequency spectrum, registering, with the base station, on a second cell supporting a second RAT different from the first RAT and at least partially overlapping with the first cell in the frequency spectrum based on the base station supporting dynamic sharing of the frequency spectrum between the first RAT and the second RAT, and communicating with the base station based on the registering on the first cell supporting the first RAT and the registering on the second cell supporting the second RAT.

A non-transitory computer-readable medium storing code for wireless communications implemented by a UE is described. The code may include instructions executable by a processor to register, with a base station, on a first cell supporting a first RAT in a frequency spectrum, register, with the base station, on a second cell supporting a second RAT different from the first RAT and at least partially overlapping with the first cell in the frequency spectrum based on the base station supporting dynamic sharing of the frequency spectrum between the first RAT and the second RAT, and communicate with the base station based on the registering on the first cell supporting the first RAT and the registering on the second cell supporting the second RAT.

Some aspects of the method, apparatuses, and non-transitory computer-readable medium described herein may further include operations, features, means, or instructions for receiving a cell identifier for the first cell, where the cell identifier indicates that the base station supports the dynamic sharing of the frequency spectrum between the first RAT and the second RAT.

In some aspects of the method, apparatuses, and non-transitory computer-readable medium described herein, the communicating may include operations, features, means, or instructions for performing data communications on the first cell using the first RAT and performing, at least partially concurrent to the performing the data communications, voice communications on the second cell using the second RAT.

Some aspects of the method, apparatuses, and non-transitory computer-readable medium described herein may further include operations, features, means, or instructions for establishing a first radio bearer for the communicating with the base station using the first RAT and a second radio bearer for the communicating with the base station using the second RAT.

Some aspects of the method, apparatuses, and non-transitory computer-readable medium described herein may further include operations, features, means, or instructions for caching, in local memory at the UE, an indication that the base station supports the dynamic sharing of the frequency spectrum between the first RAT and the second RAT.

Some aspects of the method, apparatuses, and non-transitory computer-readable medium described herein may further include operations, features, means, or instructions for receiving, in a control channel for the first RAT, a control message indicating a first set of resources in the frequency spectrum for communications using the first RAT and a second set of resources in the frequency spectrum for communications using the second RAT.

In some aspects of the method, apparatuses, and non-transitory computer-readable medium described herein, the control message may be received on a primary carrier corresponding to the first RAT.

Some aspects of the method, apparatuses, and non-transitory computer-readable medium described herein may further include operations, features, means, or instructions for using a single radio frequency (RF) transceiver to receive the first set of resources and the second set of resources.

In some aspects of the method, apparatuses, and non-transitory computer-readable medium described herein, the registering on the first cell supporting the first RAT and the registering on the second cell supporting the second RAT include a dual registration procedure.

Some aspects of the method, apparatuses, and non-transitory computer-readable medium described herein may further include operations, features, means, or instructions for displaying, in a user interface of the UE, an icon indicating that the UE supports the dynamic sharing of the frequency spectrum between the first RAT and the second RAT.

In some aspects of the method, apparatuses, and non-transitory computer-readable medium described herein, the communicating may include operations, features, means, or instructions for communicating with the base station on a first carrier using the first RAT based on the registering on the first cell supporting the first RAT and communicating with the base station on a second carrier using the second RAT based on the registering on the second cell supporting the second RAT.

In some aspects of the method, apparatuses, and non-transitory computer-readable medium described herein, the first carrier and the second carrier are a same carrier.

In some aspects of the method, apparatuses, and non-transitory computer-readable medium described herein, the first RAT may be a 5G NR technology and the second RAT may be an LTE technology.

A method for wireless communications implemented by a base station is described. The method may include configuring a frequency spectrum for dynamic sharing between a first RAT and a second RAT, registering a UE on a first cell supporting the first RAT in the frequency spectrum, registering the UE on a second cell supporting the second RAT different from the first RAT and at least partially overlapping with the first cell in the frequency spectrum based on the configuring, and communicating with the UE based on the registering the UE on the first cell supporting the first RAT and the registering the UE on the second cell supporting the second RAT.

An apparatus for wireless communications implemented by a base station is described. The apparatus may include a processor, memory coupled with the processor, and instructions stored in the memory. The instructions may be executable by the processor to cause the apparatus to configure a frequency spectrum for dynamic sharing between a first RAT and a second RAT, register a UE on a first cell supporting the first RAT in the frequency spectrum, register the UE on a second cell supporting the second RAT different from the first RAT and at least partially overlapping with the first cell in the frequency spectrum based on the configuring, and communicate with the UE based on the registering the UE on the first cell supporting the first RAT and the registering the UE on the second cell supporting the second RAT.

Another apparatus for wireless communications implemented by a base station is described. The apparatus may include means for configuring a frequency spectrum for dynamic sharing between a first RAT and a second RAT, registering a UE on a first cell supporting the first RAT in the frequency spectrum, registering, the UE on a second cell supporting the second RAT different from the first RAT and at least partially overlapping with the first cell in the frequency spectrum based on the configuring, and communicating with the UE based on the registering the UE on the first cell supporting the first RAT and the registering the UE on the second cell supporting the second RAT.

A non-transitory computer-readable medium storing code for wireless communications implemented by a base station is described. The code may include instructions executable by a processor to configure a frequency spectrum for dynamic sharing between a first RAT and a second RAT, register a UE on a first cell supporting the first RAT in the frequency spectrum, register the UE on a second cell supporting the second RAT different from the first RAT and at least partially overlapping with the first cell in the frequency spectrum based on the configuring, and communicate with the UE based on the registering the UE on the first cell supporting the first RAT and the registering the UE on the second cell supporting the second RAT.

Some aspects of the method, apparatuses, and non-transitory computer-readable medium described herein may further include operations, features, means, or instructions for transmitting a cell identifier for the first cell, the second cell, or both, where the cell identifier may be associated with support of the dynamic sharing between the first RAT and the second RAT, where the registering the UE on the second cell supporting the second RAT may be based on the cell identifier.

In some aspects of the method, apparatuses, and non-transitory computer-readable medium described herein, the communicating may include operations, features, means, or instructions for performing data communications on the first cell using the first RAT and performing, at least partially concurrent to the performing the data communications, voice communications on the second cell using the second RAT.

Some aspects of the method, apparatuses, and non-transitory computer-readable medium described herein may further include operations, features, means, or instructions for directing traffic associated with the voice communications to the second RAT based on the second RAT supporting a threshold quality of service (QoS) for the voice communications.

Some aspects of the method, apparatuses, and non-transitory computer-readable medium described herein may further include operations, features, means, or instructions for maintaining data connectivity using the first RAT during the performing the voice communications using the second RAT.

Some aspects of the method, apparatuses, and non-transitory computer-readable medium described herein may further include operations, features, means, or instructions for transmitting, in a control channel for the first RAT, a control message indicating a first set of resources in the frequency spectrum for communications using the first RAT and a second set of resources in the frequency spectrum for communications using the second RAT.

In some aspects of the method, apparatuses, and non-transitory computer-readable medium described herein, the registering the UE on the first cell supporting the first RAT and the registering the UE on the second cell supporting the second RAT include a dual registration procedure for the UE.

In some aspects of the method, apparatuses, and non-transitory computer-readable medium described herein, the communicating may include operations, features, means, or instructions for communicating with the UE on a first carrier using the first RAT based on the registering the UE on the first cell supporting the first RAT and communicating with the UE on a second carrier using the second RAT based on the registering the UE on the second cell supporting the second RAT.

In some aspects of the method, apparatuses, and non-transitory computer-readable medium described herein, the first carrier and the second carrier are a same carrier.

In some aspects of the method, apparatuses, and non-transitory computer-readable medium described herein, the first RAT may be a 5G NR technology and the second RAT may be an LTE technology.

DETAILED DESCRIPTION

Figure 1:
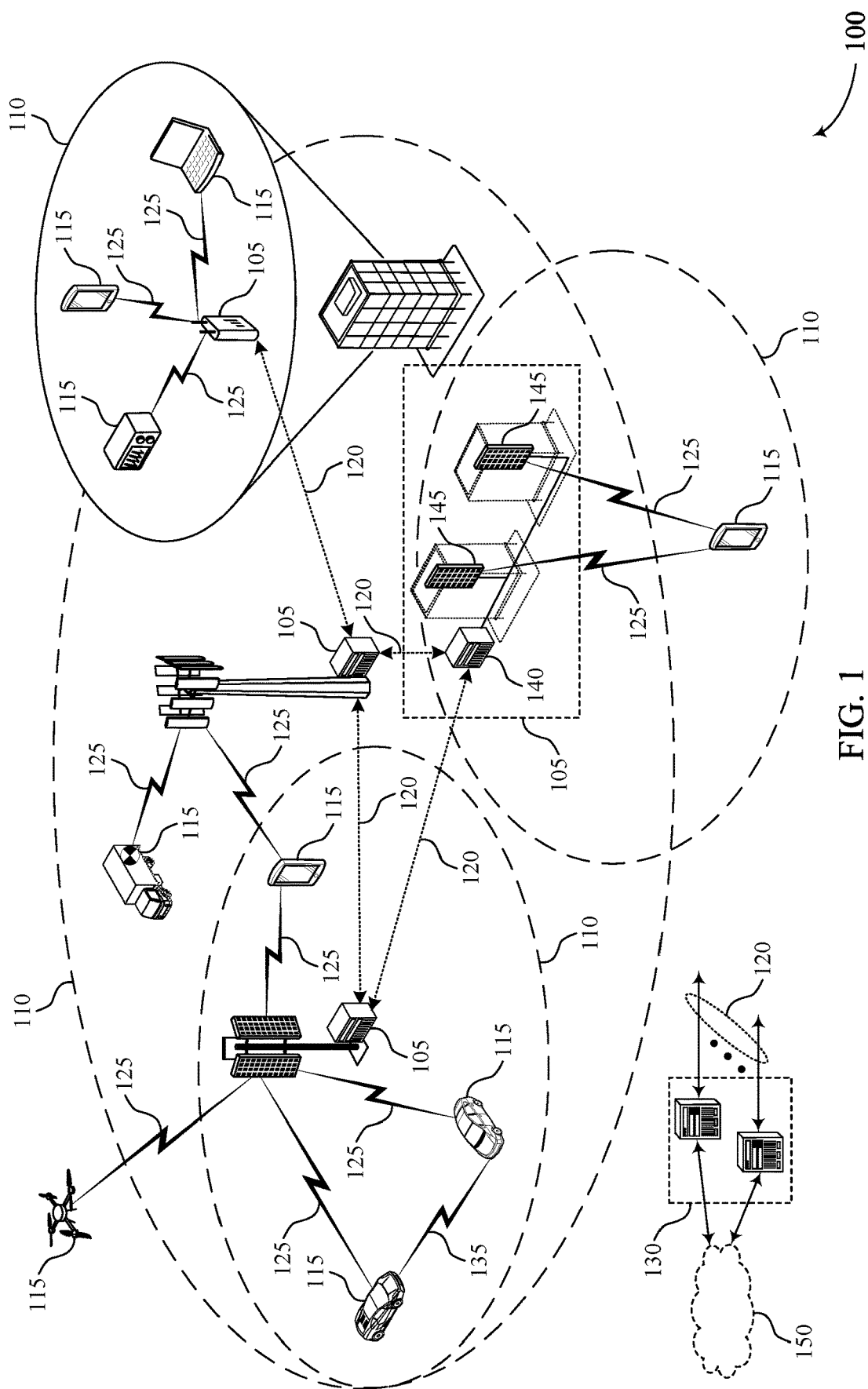
FIGS. 1 and 2 illustrate aspects of wireless communications systems that support enhancements for multiple radio protocol dynamic spectrum sharing (DSS) in accordance with aspects of the present disclosure.

Some wireless communications systems may implement dynamic spectrum sharing (DSS) between radio protocols (e.g., radio access technologies (RATs)) in the time and/or frequency domain. In some cases, DSS may support the coexistence of Long Term Evolution (LTE) and New Radio (NR) operations in the same frequency band. DSS may allow for user equipment (UEs) to operate in NR for longer time durations and to reduce the frequency of inter-RAT handover to LTE. DSS may further reuse LTE bands, efficiently utilizing the excess capacity of some LTE networks and providing support for low-band NR. Additionally, DSS may improve NR coverage, which may be limited in high frequency bands. However, to effectively implement DSS (e.g., to support efficient spectrum usage by UEs, reduce fallback latency for UEs, etc.), a system may implement one or more techniques to improve UE allocations, functionality, or both in dynamically shared frequency spectrums.

In some aspects, a network implementing DSS for NR and LTE may configure a frequency spectrum with multiple bandwidth parts (BWPs), in which a first subset of the BWPs are dedicated for NR and a second subset of BWPs support DSS between NR and LTE. A UE communicating with the network via a base station may transmit an indication of a rate matching capability of the UE. This rate matching capability may indicate whether the UE supports rate matching NR communications around LTE cell-specific reference signals (CRSs). The network may activate a BWP of the configured BWPs for the UE based on the rate matching capability. In one aspect, the network may active a BWP dedicated for NR if the UE does not support rate matching with LTE CRS and may active a BWP supporting DSS if the UE does support rate matching with LTE CRS. Additionally or alternatively, the network may switch a UE from one BWP to another BWP based on a frequency of handover for the UE. In one aspect, based on the UE's mobility conditions and a frequency of handover greater than a threshold frequency while the UE operates on an NR-dedicated band, the network may switch the UE to a band (e.g., a BWP) supporting DSS to reduce the frequency of handover.

Additionally or alternatively, in some aspects, a network may support dual registration for a UE operating in a DSS band. The UE may register with a base station on both LTE and NR concurrently if the base station supports DSS. In some cases, the UE may use an NR carrier for data communications while using an LTE carrier for voice calls. In some aspects, the network may implement a single control channel for scheduling data communications for multiple RATs. The base station may schedule LTE and NR data communications through a common control channel (e.g., the NR control channel) to reduce the control overhead for a UE dual registered on both LTE and NR. In some cases, an icon displayed on the user interface for such a UE may indicate that the UE supports DSS operation, dual registration, or both.

Aspects of the disclosure are initially described in the context of wireless communications systems. Additional aspects of the disclosure are described with reference to frequency resource allocations and process flows. Aspects of the disclosure are further illustrated by and described with reference to apparatus diagrams, system diagrams, and flowcharts that relate to enhancements for multiple radio protocol DSS.

FIG. 1 illustrates aspects of a wireless communications system 100 that supports enhancements for multiple radio protocol DSS in accordance with aspects of the present disclosure. The wireless communications system 100 may include one or more base stations 105, one or more UEs 115, and a core network 130. In some aspects, the wireless communications system 100 may support LTE networks or New Radio (NR) networks. An LTE network may be, in some aspects, an LTE network, an LTE-Advanced (LTE-A) network, an LTE-A Pro network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some aspects UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some cases (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some cases the carrier bandwidth may be referred to as a "system bandwidth" of the carrier or the wireless communications system 100. In one aspect, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, in some cases, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In some other aspects, the overlapping geographic coverage areas 110 associated with different technologies may be supported by different base stations 105. The wireless communications system 100 may include, in some cases, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or fifth generation (5G) core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an aspect of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. In one aspect, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems 100 may support spectrum sharing (e.g., downlink spectrum sharing, uplink spectrum sharing, or both) in the time domain, the frequency domain, or both. In some cases, the spectrum sharing may be dynamic based on LTE and NR traffic distribution in the system or in the frequency spectrum. DSS may allow the network to reuse frequency bands for NR communications that were previously allocated for LTE communications. In one aspect, a base station 105 may include LTE communications, NR communications, or a combination thereof in a given frequency spectrum based on the load conditions in the wireless communications system 100, such that NR may coexist effectively with LTE in the same frequency band.

In some cases, when a UE 115 connects to a DSS-supported base station 105, the base station 105 may provide the UE 115 with LTE broadcast information in an NR message. As such, the UE 115 may determine resources to avoid (e.g., resources including LTE broadcast signals, such as LTE CRSs) and resources to monitor for NR signaling. DSS may allow for the UE 115 to remain using NR operations for a greater proportion of time (e.g., as opposed to maintaining LTE frequency bands as dedicated for LTE) and to reduce the frequency of the UE 115 performing inter-RAT handover procedures to LTE. Further, reusing the LTE bands may efficiently utilize the excess capacity of some LTE frequency spectrum bands and provide support for low-band NR. Additionally, DSS may improve NR coverage, which may be limited in high frequency bands. However, to effectively implement DSS (e.g., to support efficient spectrum usage by UEs 115, reduce fallback latency for UEs 115, etc.), the wireless communications system 100 may implement one or more techniques to improve UE 115 allocations, functionality, or both in dynamically shared frequency spectrums. These techniques may improve reuse of the frequency spectrum between different RATs (e.g., LTE and NR) by implementing static spectrum re-farming (e.g., of the LTE spectrum), employing DSS, or both.

Figure 2:
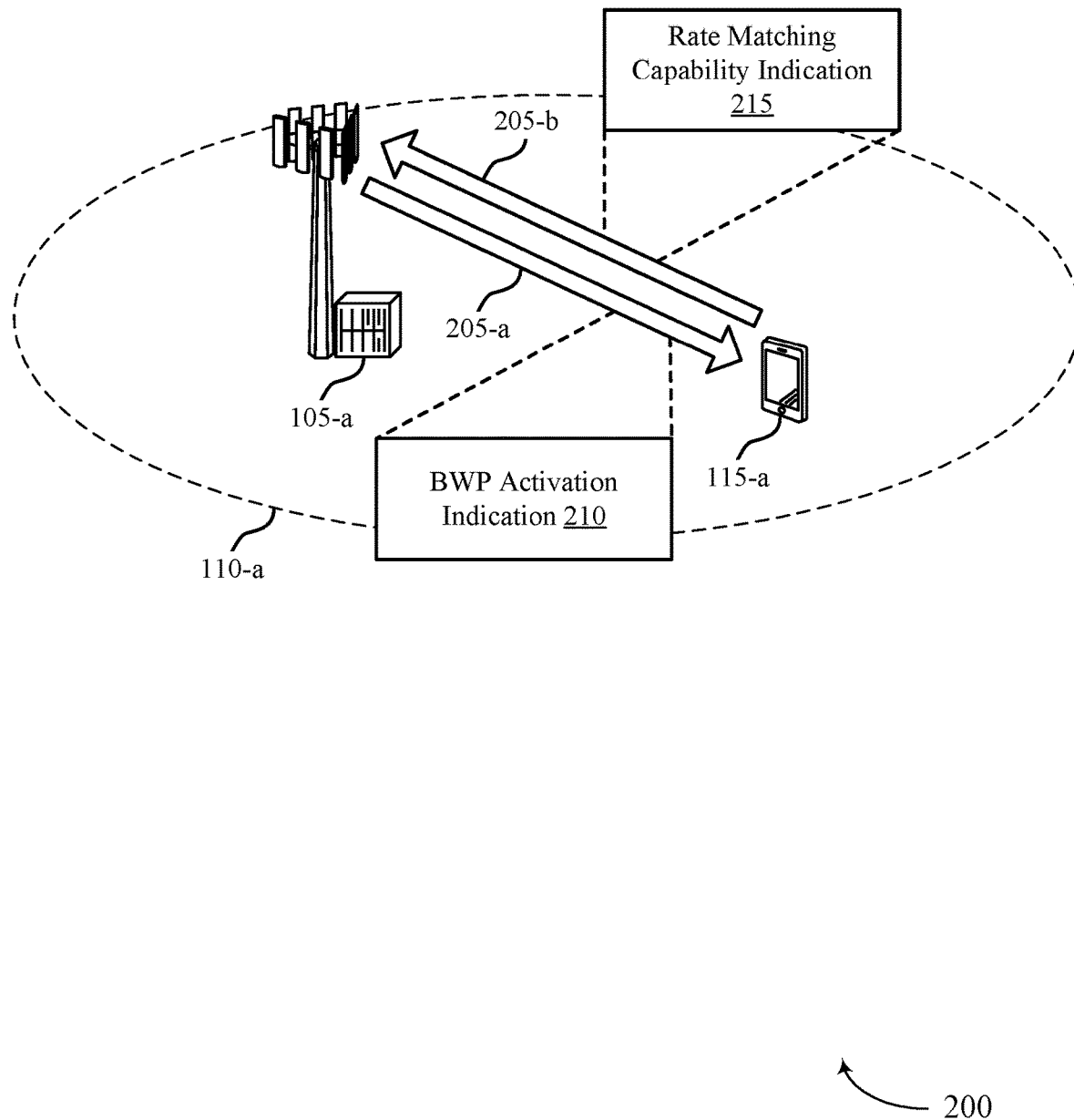

FIG. 2 illustrates aspects of a wireless communications system 200 that supports enhancements for multiple radio protocol DSS in accordance with aspects of the present disclosure. In some aspects, wireless communications system 200 may implement aspects of wireless communications system 100. Wireless communications system 200 may include base station 105-a and UE 115-a, which may be examples of the corresponding devices as described with reference to FIG. 1. Base station 105-a may serve a geographic coverage area 110-a. Base station 105-a and UE 115-a may be capable of using one or more radio protocols (e.g., one or more RATs, such as NR, LTE, or both), which may share the same carrier frequency or frequency band. It is to be understood that references to specific RATs (e.g., LTE and NR) are provided for illustrative purposes only, and different RATs not specifically referred to herein may be used interchangeably with those described below.

In accordance with the present disclosure, wireless communications system 200 may support communication links 205 between devices such as UE 115-a and base station 105-a, where UE 115-a and base station 105-a may communicate in radio frequency spectrum bands. Base station 105-a and UE 115-a may operate over a carrier bandwidth. In some cases, base station 105-a may divide the carrier bandwidth into multiple (e.g., up to two, four, or more) BWPs, which may be configured with different properties (e.g., protocol features, numerologies, modulation schemes, physical channels, etc.). Each BWP may include a contiguous set of resource blocks on a carrier bandwidth, and the different BWPs may or may not be contiguous in frequency (e.g., each BWP may be adjacent in frequency to at least one other BWP, or some BWPs may have gaps or guardbands to adjacent BWPs). In some cases, BWPs may be defined for NR carriers, while LTE carriers may divide frequency into different regions but may not vary some properties (e.g., numerology) across regions. In some cases, LTE carriers may have a lower maximum carrier bandwidth than NR carriers, and thus one NR carrier may span one or more LTE carriers, and one or more NR BWPs may correspond in frequency to one or more LTE carriers. In some aspects, each BWP or subset of BWPs may be configured for one or more RATs. A first subset of BWPs may be dedicated for use with a first RAT (e.g., NR) and a second subset of BWPs may be dynamically shared between the first RAT and a second RAT (e.g., LTE) by employing DSS.

Base station 105-a may communicate with UE 115-a over communication link 205-a, which may be an NR communication link. Base station 105-a may configure UE 115-a with a number of BWPs and may activate a specific BWP for UE 115-a to use. UE 115-a may communicate in the activated BWP according to the configured parameters for communicating in each of the BWPs. Base station 105-a may transmit an indication of the activated BWP to UE 115-a over communication link 205-a (e.g., in a downlink channel) in a BWP activation indication 210 (e.g., in dedicated radio resource control (RRC) signaling, a downlink control information (DCI) message, etc.). In some aspects, base station 105-a may assign a BWP based on capabilities of UE 115-a, capabilities of other UEs 115 operating within coverage area 110-a, a network load balance, or some combination thereof. In some cases, base station 105-a may perform BWP activation differently based on load balance and/or capability information.

Wireless devices operating in wireless communications system 200, such as UE 115-a, may be capable of rate matching between different RATs. In one aspect, UE 115-a may use a first RAT but may be capable of rate matching signals using the first RAT with signals or channels (e.g., CRS, a control channel) for a second RAT. Rate matching between RATs may allow UEs 115 communicating with base station 105-a to use different physical layer technologies with different transmission rates more efficiently, which may reduce overhead and increase throughput. If UE 115-a is not implementing rate matching (e.g., if UE 115-a is an LTE UE incapable of rate matching between NR messages and LTE CRSs or if rate matching is otherwise disabled at UE 115-a), there may be fewer resource elements available on which to schedule transmissions (e.g., physical downlink shared channel (PDSCH) messages) for UE 115-a. In one aspect, a UE 115 not implementing rate matching may communicate using a first RAT (e.g., NR) in one or more resources time division multiplexed (TDMed) with resources used for a second RAT (e.g., LTE). That is, the one or more resources used for the first RAT may include transmission time intervals (TTIs)—such as symbols—in which, across all sub-carriers of the one or more resources (e.g., for a particular BWP), there are no communications scheduled for the second RAT, such as LTE CRSs. In contrast, a UE 115 implementing rate matching between the first RAT and the second RAT may communicate using the first RAT (e.g., NR) in resources frequency division multiplexed (FDMed) with resources used for the second RAT (e.g., LTE). Accordingly, base station 105-a may have more flexibility in scheduling UEs 115 that support rate matching for communications in a dynamically shared frequency spectrum than UEs 115 that are not using rate matching.

UE 115-a may indicate its rate matching capability to base station 105-a over communication link 205-b (e.g., in a rate matching capability indication 215). In some cases, the rate matching capability indication 215 (e.g., a bit indicating whether the UE 115-a has "rateMatchingLTE-CRS supported") may be part of a capabilities report transmitted by UE 115-a. Base station 105-a may use the rate matching information to determine an appropriate BWP to activate for UE 115-a (e.g., to increase throughput). In some aspects, if UE 115-a is not capable of—or otherwise not implementing—rate matching, base station 105-a may assign UE 115-a to a BWP dedicated to a single RAT (e.g., NR). In BWPs dedicated for a single RAT (e.g., either NR or LTE), base station 105-a may schedule resource elements of the first and second RATs in mutually exclusive times and frequencies (e.g., separate frequency bands or BWPs). As such, base station 105-a may schedule communications for the UE 115-a in any resources within the BWP without the UE 115-a performing rate matching with LTE communications. Alternatively, if UE 115-a supports rate matching, base station 105-a may prioritize activation and assignation of a BWP that supports DSS. In BWPs supporting DSS between multiple RATs (e.g., NR and LTE), base station 105-a may schedule communications for the UE 115-a in resource elements for the first RAT FDMed with resource elements for the second RAT (e.g., as the UE 115-a may rate match the communications using the first RAT with communications using the second RAT).

Additionally or alternatively, base station 105-a may determine a network load balance, and may use the network load balance to determine which BWP to assign to UE 115-a. In some aspects, the assignation may be dynamic based on a traffic distribution between the first and second RATs and/or between the different BWPs. Base station 105-a may determine the amount of traffic using each RAT. Additionally or alternatively, base station 105-a may receive rate matching capability indications 215 from multiple UEs 115 operating within coverage area 110-a. Base station 105-a may activate a specific BWP for each UE 115 connected to the base station 105-a based on the network load balancing calculation. In some aspects, base station 105-a may match UEs 115 to BWPs such that the total throughput of the cell is maximized.

To optimize the average throughput for any UE 115, base station 105-a may periodically switch a UE 115 from one BWP to another. In one aspect, base station 105-a may periodically or aperiodically switch UE 115-a from an NR-dedicated BWP to a DSS-deployed BWP—or vice versa—to efficiently spread NR overhead amongst the available resource elements and/or resource blocks in the configured set of BWPs. In some cases, base station 105-a may reassign UEs 115 operating within coverage area 110-a to BWPs that more efficiently support their capabilities. In an aspect, base station 105-a may switch UE 115-a from a BWP that supports DSS to a BWP that does not employ DSS. Base station 105-a may use rate matching indications from UEs 115 in coverage area 110-a for base station 105-a in combination with the determined network load to assign or reassign UEs 115 to different configured BWPs.

In some cases, base station 105-a may identify that a UE 115 (e.g., UE 115-a) assigned to a first BWP (e.g., an NR-dedicated BWP) is performing frequent handover procedures. This frequent handover may be due to increased mobility of the UE 115, small cell sizes, or the like. In some aspects, the UE 115 may operate on a high frequency NR band (e.g., a frequency band greater than some threshold frequency). A high frequency band may correspond to a relatively small cell range, such that UEs 115 operating on such a high frequency band may frequently perform handover procedures to other cells (e.g., other cells with relatively small cell sizes). Base station 105-a may determine that switching UE 115-a from the first BWP to a second BWP (e.g., a BWP corresponding to a relatively lower frequency band below the threshold frequency) may reduce the number of handover procedures. The first and second BWPs may be in the same or different carriers. In one aspect, the first BWP may be dedicated to a first RAT (e.g., NR), and the second BWP may support DSS between the first RAT and a second RAT (e.g., LTE). Switching UE 115-*a* from an NR-dedicated high frequency BWP to a low frequency BWP that supports DSS may support a greater cell size, allowing the UE 115 to use both RATs and reduce handover frequency (e.g., based on a relatively larger cell at the relatively lower frequency). Base station 105-*a* may indicate the switch to UE 115-*a* over communication link 205-*a*. In some aspects, base station 105-*a* may further switch UE 115-*a* from a first cell supporting a first carrier in a first frequency band to a second cell that supports a second carrier in a second frequency band. In one aspect, as described herein, UE 115-*a* may be switched to a cell that is larger than the first cell, and thus UE 115-*a* may be able to remain connected to that cell even in mobile conditions (e.g., for a longer time duration).

Figure 3:
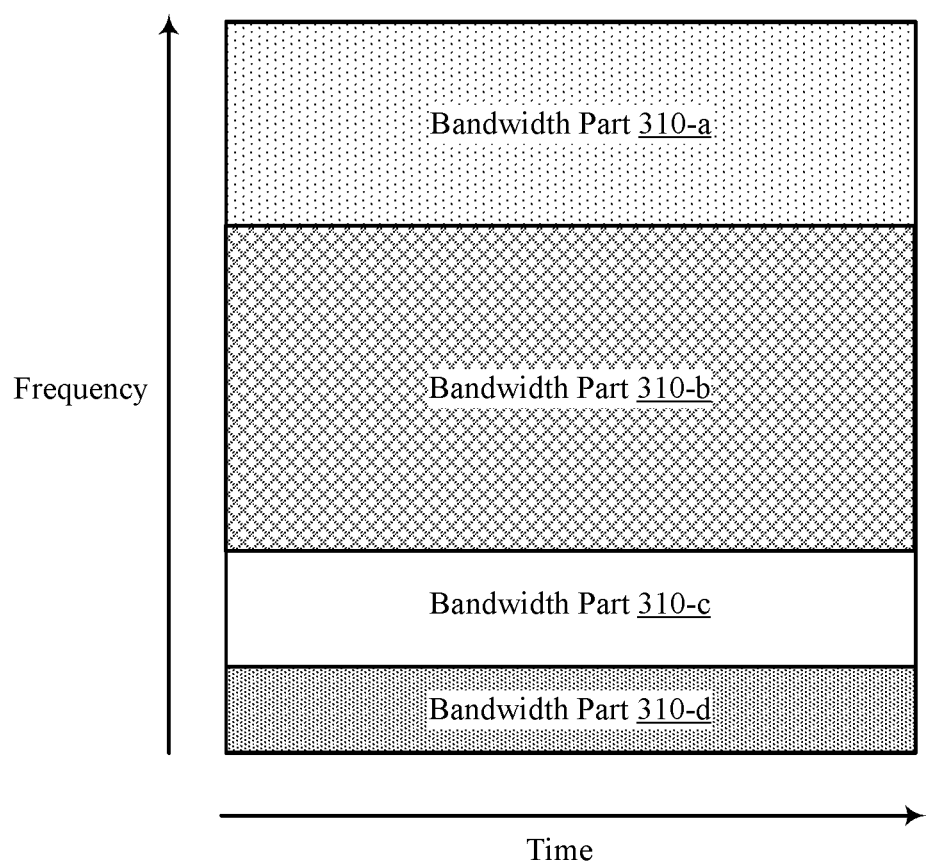
FIG. 3 illustrates aspects of a carrier bandwidth that supports enhancements for multiple radio protocol DSS in accordance with aspects of the present disclosure.

FIG. 3 illustrates aspects of a carrier bandwidth 300 that supports enhancements for multiple radio protocol DSS in accordance with aspects of the present disclosure. Carrier bandwidth 300 may be an example of a carrier bandwidth used by a base station 105 as described with reference to FIGS. 1 and 2. In some aspects, carrier bandwidth 300 may implement aspects of wireless communications systems 100 and 200. Carrier bandwidth 300 may include a number of configured BWPs 310 (e.g., pre-configured BWPs 310 or BWPs 310 configured by a base station 105). As illustrated, in some aspects, carrier bandwidth 300 may include up to four BWPs 310. However, in some other aspects, carrier bandwidth 300 may include any number of BWPs 310.

As described herein, a base station 105 may use carrier bandwidth 300 for communications with one or more UEs 115. The base station may configure carrier bandwidth 300 with a number of BWPs 310, where each BWP 310 may be configured with different parameters (e.g., numerologies, modulation schemes, physical channels, frequency ranges, etc.). Additionally, each BWP 310 may be configured to use a first protocol (e.g., NR), a second protocol (e.g., LTE), or both (e.g., by using DSS between the first and second protocols). In one aspect, BWPs 310-*a* and 310-*c* may be configured to use NR and BWPs 310-*b* and 310-*d* may be configured to use DSS between NR and LTE.

As described with reference to FIG. 2, a base station 105 may activate a specific BWP 310 for a UE 115 based on the network load, the rate matching capability indicated by the UE 115, or some combination thereof. The base station may prioritize use of dedicated BWPs (e.g., BWPs 310 dedicated for a specific RAT, rather than support spectrum sharing between multiple RATs) for UEs 115 that are not implementing rate matching and use of DSS BWPs (e.g., BWPs 310 supporting spectrum sharing between multiple RATs) for UEs 115 that are capable of rate matching between the multiple supported RATs. In one aspect, a base station 105 may receive an indication that a first UE 115 does not support rate matching. The base station 105 may activate an NR-dedicated BWP 310-*a* for the first UE 115 based on the first UE's rate matching indication (e.g., indicating that the UE 115 does not support rate matching of NR communications with LTE communications). Operating in the NR-dedicated BWP 310-*a* may allow the first UE 115 to avoid a large overhead and/or limited scheduling flexibility that may accompany a non-rate matching UE 115 operating in a DSS BWP 310 (e.g., based on LTE communications, such as LTE CRSs, being present in the DSS BWP 310). The base station 105 may receive another indication that a second UE 115 is capable of rate matching and may activate a DSS BWP 310-*b* for the second UE 115 based on the second UE's rate matching indication (e.g., indicating that the UE 115 supports rate matching of NR communications with LTE communications). The second UE 115 may be scheduled with NR communications that are TDMed or FDMed with LTE communications in the DSS BWP 310-*b* based on the second UE 115 supporting rate matching between NR and LTE, such as LTE CRSs. In some aspects, the second UE 115 may be scheduled in TTIs that overlap with TTIs used for LTE communications and have LTE CRS present.

In another aspect, a base station 105 may reassign UEs 115 operating within the coverage area 110 of the base station 105 to BWPs 310 that more efficiently support the capabilities of the UEs 115. In this manner, the base station 105 may intelligently match UEs 115 to appropriate BWPs 310 such that the total throughput of the cell across all UEs 115 is maximized. In some cases, the base station 105 may dynamically configure the BWPs 310—such as which BWPs 310 support DSS and which BWPs 310 are dedicated for NR—based on the UEs 115 in the system (e.g., the current UEs 115 in the system, historical information about UEs 115 in the system, etc.). In one aspect, if the UEs 115 in the system are predominantly LTE UEs 115 or UEs 115 supporting rate matching between NR and LTE, the base station 105 may configure a larger proportion of the BWPs 310 for DSS. In another aspect, if the UEs 115 in the system are predominantly NR UEs 115 not implementing rate matching between NR and LTE, the base station 105 may configure a larger proportion of the BWPs 310 as NR-dedicated BWPs 310.

Figure 4:
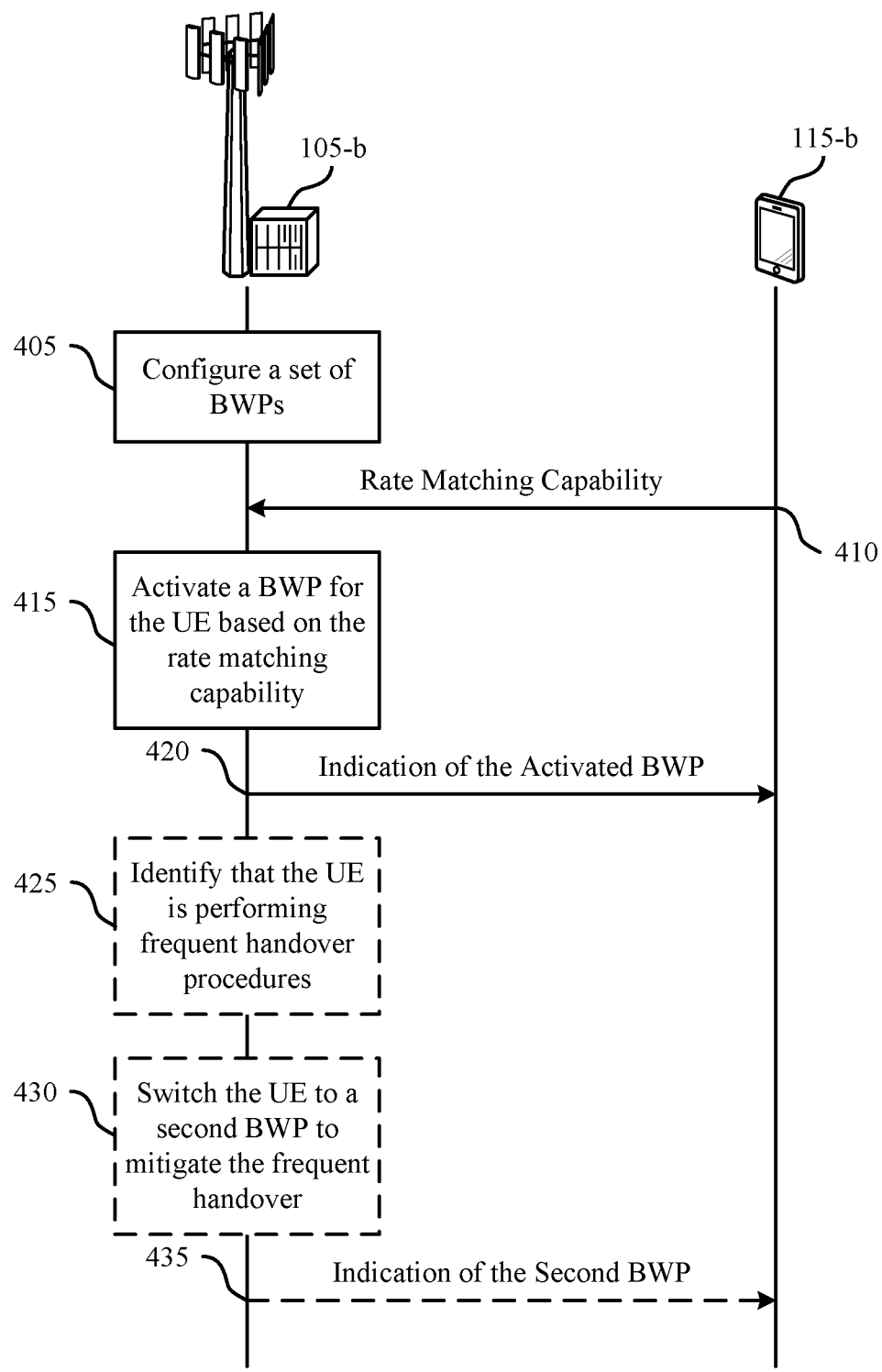
FIG. 4 illustrates aspects of a process flow that supports enhancements for multiple radio protocol DSS in accordance with aspects of the present disclosure.

FIG. 4 illustrates aspects of a process flow 400 that supports enhancements for multiple radio protocol DSS in accordance with aspects of the present disclosure. In some aspects, the process flow 400 may implement aspects of wireless communications systems 100 and 200. Base station 105-*b* may support DSS between a first RAT (e.g., NR) and a second RAT (e.g., LTE) and may activate a BWP for UE 115-*b* based on a capability or mobility condition of UE 115-*b*. Base station 105-*b* and UE 115-*b* may be examples of the corresponding wireless devices described with reference to FIGS. 1 through 3. Alternative aspects of the following may be implemented, where some steps are performed in a different order than described or are not performed at all. In some cases, steps may include additional features not mentioned below, or further steps may be added.

At 405, base station 105-*b* may identify a configuration for a frequency spectrum. In some cases, the frequency spectrum may be pre-configured, and base station 105-*b* may indicate the pre-configuration to UE 115-*b*. In some other cases, base station 105-*b* may dynamically or semi-statically configure the frequency spectrum (e.g., based on current or historical traffic information for the base station's cell). The configuration may include a set of BWPs (e.g., up to four BWPs) such that a first subset of the set of BWPs is dedicated for a first RAT (e.g., NR) and a second subset of the set of BWPs is dynamically shared between the first RAT and a second RAT (e.g., supporting DSS for both NR and LTE).

At 410, UE 115-*b* may transmit an indication of a rate matching capability of the UE 115-*b*. Base station 105-*b* may receive the indication of the rate matching capability and, at 415, base station 105-*b* may activate a BWP of the set of BWPs for UE 115-*b* based on the rate matching capability for the UE 115-*b*. In some aspects, if UE 115-*b* indicates an absence of support for rate matching communications for the first RAT (e.g., NR) with a CRS for the second RAT (e.g., LTE), base station 105-*b* may activate a BWP from the first subset of the set of BWPs (e.g., a BWP dedicated for the first RAT) based on the absence of support for rate matching. In some other aspects, if UE 115-*b* indicates support for rate matching communications for the first RAT (e.g., NR) with a CRS for the second RAT (e.g., LTE), base station 105-*b* may activate a BWP from the second subset of the set of BWPs (e.g., a BWP supporting DSS) based on the support for rate matching. In some cases, base station 105-*b* may activate a specific BWP for a specific UE 115 further based on load balancing between a set of UEs 115.

At 420, base station 105-*b* may transmit, to UE 115-*b*, an indication of the activated BWP for communication. UE 115-*b* and base station 105-*b* may communicate with one another on the activated BWP.

In some cases, at 425, base station 105-*b* may identify that UE 115-*b* performs a number of handover procedures greater than a threshold number of handover procedures while communicating in the activated BWP. At 430, base station 105-*b* may switch the UE 115-*b* from the activated BWP to a second BWP of the set of BWPs based on the identified number of handover procedures. In one aspect, base station 105-*b* may switch UE 115-*b* from a BWP that is dedicated for NR (e.g., a relatively high frequency band) to a BWP that supports DSS (e.g., a relatively low frequency band). At 435, base station 105-*b* may transmit, to UE 115-*b*, an indication of the second BWP for communication based on the switching.

Figure 5:
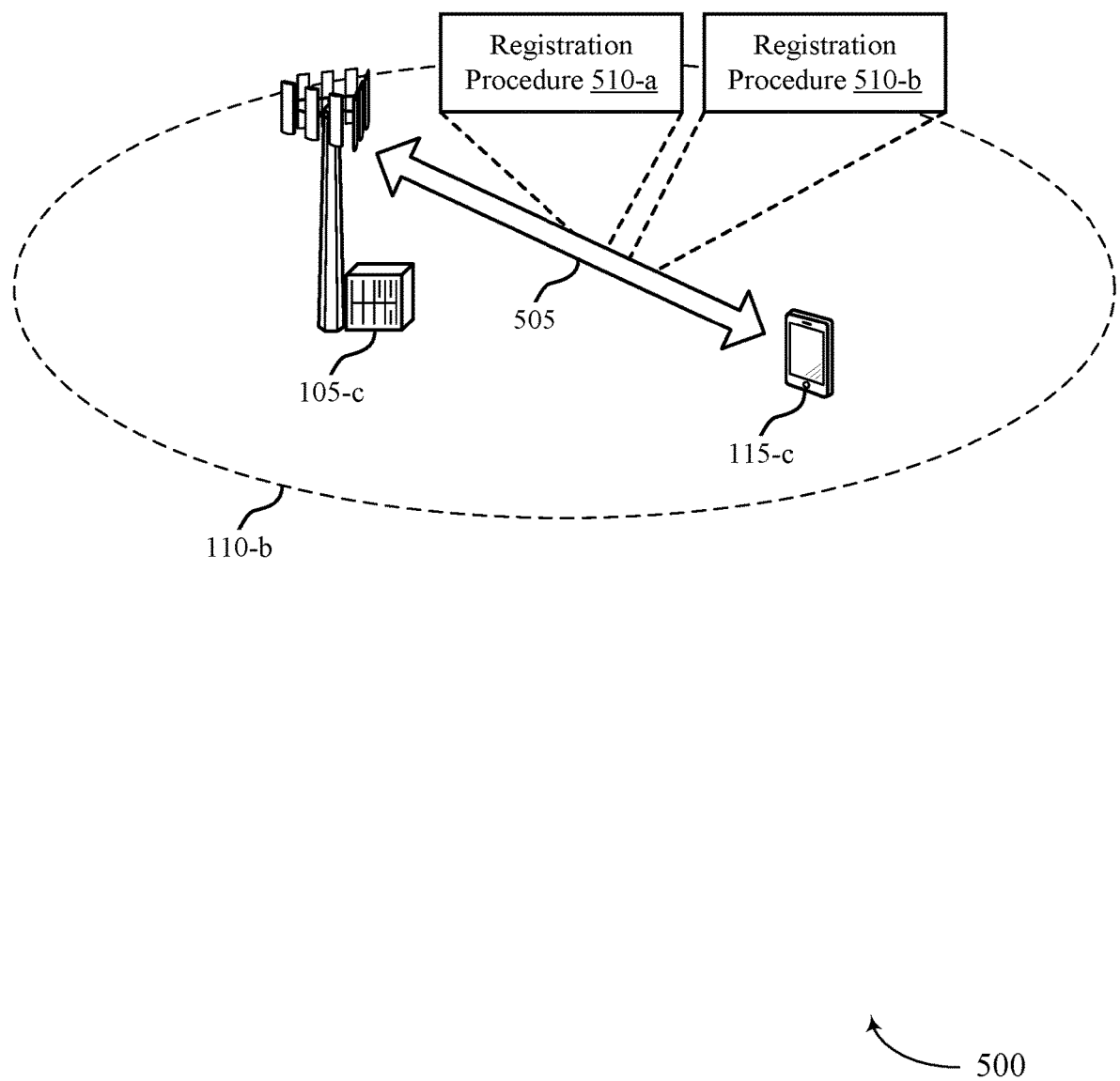
FIG. 5 illustrates aspects of a wireless communications system that supports enhancements for multiple radio protocol DSS in accordance with aspects of the present disclosure.

FIG. 5 illustrates aspects of a wireless communications system 500 that supports enhancements for multiple radio protocol DSS in accordance with aspects of the present disclosure. In some aspects, wireless communications system 500 may implement aspects of wireless communications systems 100 or 200. In one aspect, wireless communications system 500 includes base station 105-*c* and UE 115-*c*, which may be examples of the corresponding devices as described with reference to FIGS. 1 and 2. Base station 105-*c* may serve a geographic coverage area 110-*b*. Base station 105-*c* and UE 115-*c* may be capable of using one or more RATs (e.g., NR, LTE, etc.), which may share the same carrier frequency or frequency band. It is to be understood that references to specific RATs (e.g., LTE and NR) are provided for illustrative purposes only, and different RATs not specifically referred to herein may be used interchangeably with those described below.

In some cases, UE 115-*c* may be capable of dual registration, such that UE 115-*c* may register with a cell for multiple RATs. Specifically, UE 115-*c* may include a radio frequency chain that may be capable of receiving and transmitting in multiple RATs. UE 115-*c* may use a communication link 505 to initiate a registration procedure 510-*a* to begin communicating with base station 105-*c*. The registration procedure 510-*a* may be performed for a first cell on a first carrier supporting a first RAT (e.g., NR). During the registration procedure 510-*a*, UE 115-*c* may receive information (e.g., a cell identifier) indicating that base station 105-*c* supports DSS between the first RAT and a second RAT (e.g., LTE) in a frequency spectrum. UE 115-*c* may perform a second registration procedure 510-*b* for a second cell on a second carrier that supports the second RAT. In one aspect, the first cell and the second cell may correspond to a same cell (e.g., corresponding to a same frequency spectrum). However, in some cases, the first cell and the second cell may have different cell identifiers. In one aspect, the first cell may have an NR cell identifier, while the second cell may have an LTE cell identifier. In some aspects, the first carrier and the second carrier may be the same carrier or may be at least partially overlapping carriers (e.g., at least a portion of the first and second carriers may support DSS between the first RAT and the second RAT). In this way, UE 115-*c* may connect to a cell (e.g., supported by base station 105-*c*) using multiple different RATs (e.g., both NR and LTE) and may switch between NR communications and LTE communications without detaching from the cell. In some cases, UE 115-*c* may communicate (e.g., receive) using NR and LTE concurrently.

After performing dual registration, UE 115-*c* may be able to use the first and second RATs concurrently in a single carrier or in overlapping carriers. In one aspect, the NR carrier and the LTE carrier may span different frequency bands, where the NR carrier may span a first set of frequency resources and the LTE carrier may span a subset of the first set of frequency resources. In some cases, UE 115-*c* may use one RAT as a primary technology (e.g., NR) and the other RAT as a secondary technology (e.g., LTE). UE 115-*c* may perform communications (e.g., data communications) on the first carrier using the first RAT and may perform communications (e.g., voice communications, data communications) on the second carrier using the second RAT. In some aspects, after completing the registration, UE 115-*c* may switch to an idle mode in one or both RATs.

In one aspect, UE 115-*c* may be engaged in data communications on the first RAT (e.g., NR) and may receive or originate a voice call (e.g., using voice over NR (VoNR)). Base station 105-*c* may seamlessly (e.g., with minimal or insignificant delay) direct the UE 115-*c* to continue the voice call on resource blocks scheduled for the second RAT (e.g., using voice over LTE (VoLTE)). In some cases, base station 105-*c* may direct traffic associated with voice communications to LTE resources based on a threshold quality of service (QoS) for voice communications supported by LTE. UE 115-*c* may be in a multi-radio bearer mode and may avoid fallback procedures used to achieve voice service. Specifically, UE 115-*c* may continue to support data communications using NR while concurrently handling voice communications using LTE.

In some cases, the second carrier may at least partially overlap with the first carrier in the frequency spectrum (e.g., an LTE 20 Megahertz (MHz) carrier may be a subset of an NR 100 MHz carrier). The subcarrier spacing of the first RAT may be an integral multiple of the subcarrier spacing of the second RAT (e.g., 15 kilohertz (kHz) for LTE, 15 kHz or 30 kHz for NR). UE 115-*c* may include one or more radio frequency chains tuned to the entire BWP for one or both of the RATs and may establish a first radio bearer for communicating with the base station 105-*c* on the first carrier and a second radio bearer for communicating with the base station 105-*c* on the second carrier. UE 115-*c* may be capable of distinguishing between signals of each RAT (e.g., based on different demodulation and decoding processes for the different radio bearers).

In some aspects, UE 115-*c* may store information indicating that base station 105-*c* supports DSS between the first and second RATs. In one aspect, UE 115-*c* may cache, in local memory of the UE 115-*c*, the cell identifier for base station 105-*c* with an indication of the DSS support. UE 115-*c* may prioritize connecting to base station 105-*c* over other base stations 105 that do not support DSS when performing future acquisition processes. Additionally or alternatively, UE 115-*c* may automatically perform dual registration (e.g., both registration procedures 510-*a* and 510-*b*) when reconnecting to base station 105-*c* based on the stored indication of DSS support (e.g., without waiting for another indication from base station **105-*c* that base station 105-*c*** supports dual registration).

DSS may enable base station **105-*c* to multiplex resource elements for both RATs in the frequency domain on the same spectrum. In some aspects, the control channel for the first RAT may be used to schedule data communications for both the first and second RATs. Having performed dual registration procedures 510-*a* and 510-*b*, UE 115-*c* (e.g., in standalone mode) may receive control messages for both RATs through a common control channel (e.g., in a control channel for the first RAT on the first carrier), avoiding separate control channels for each RAT. Each control message may indicate a set of resources (e.g., for data communications) for the respective RAT in the same carrier bandwidth. A portion of resources may be scheduled for each RAT on the same carrier bandwidth. This may enable devices supporting multiple RATs to have carrier aggregation-like advantages with a single radio frequency transceiver or chain. In some aspects, UE 115-*c* may monitor multiple carriers for different RATs using a single receive chain by receiving a signal, decoding the signal as if the signal corresponds to an LTE signal, and further decoding the signal as if the signal corresponds to an NR signal. As such, UE 115-*c*** may use a single radio frequency transceiver and/or chain to concurrently monitor for NR messages and LTE messages (e.g., in a common control channel for both NR and LTE scheduling).

In some cases, UE **115-*c* may display an icon to inform a user of the DSS capabilities of the UE 115-*c*. In one aspect, UE 115-*c* may display an icon (e.g., a merged icon of both 4G and 5G) indicating that DSS is supported, rate matching of NR and LTE is supported, dual registration is supported, or some combination thereof. In this way, a user may easily differentiate between UEs 115 supporting DSS operations and UEs 115 not supporting DSS operations. In some cases, the UE 115-*c* may display the icon when DSS is supported by both the UE 115-*c* and the currently connected base station 105-*c*, indicating that the UE 115-*c*** is currently gaining the advantages of both LTE and NR communications.

Figure 6:
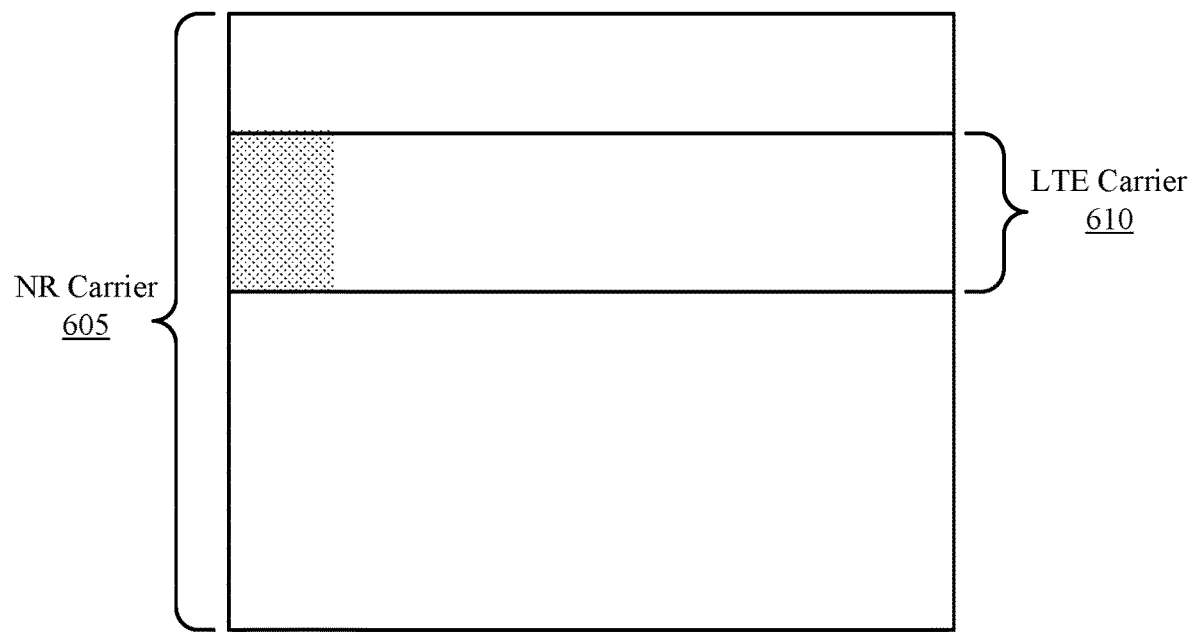
FIG. 6 illustrates aspects of a carrier bandwidth that supports enhancements for multiple radio protocol DSS in accordance with aspects of the present disclosure.
Figure 6:

FIG. 6 illustrates aspects of a carrier bandwidth 600 that supports enhancements for multiple radio protocol DSS in accordance with aspects of the present disclosure. In some aspects, carrier bandwidth 600 may implement aspects of wireless communications systems 100, 200, or 500. Carrier bandwidth 600 may be an example of a BWP 310 used by a base station 105 and/or a UE 115 as described with reference to FIG. 3. As such, carrier bandwidth 600 may be used for wireless communications with various frequency bands.

Carrier bandwidth 600 may support DSS. As described with reference to FIGS. 3 and 5, a base station 105 (e.g., supporting a cell) may support dual registration within the carrier bandwidth 600. In some aspects, carrier bandwidth 600 may include an NR carrier 605 and an LTE carrier 610. In some cases, the NR carrier 605 may encapsulate the LTE carrier 610 on a smaller sub-band. A UE 115 that successfully performs a dual registration procedure on the NR carrier 605 and the LTE carrier 610 may concurrently communicate on both carriers with the base station 105 (e.g., in a same frequency spectrum). In one aspect, a UE 115 may be tuned to the full carrier bandwidth 600 to monitor for both NR messages (e.g., in the NR carrier 605) and LTE messages (e.g., in the LTE carrier 610). Some resource blocks in the carrier bandwidth 600 may be scheduled for NR communications and some resource blocks in the carrier bandwidth 600 may be scheduled for LTE communications. In some cases, the base station 105 may perform the scheduling in a single control channel 615 (e.g., an NR control channel) that can schedule both NR and LTE communications. In one aspect, control messages in DCI in control channel 615 may include an indicator of a RAT for a resource allocation, and a UE 115 receiving a control message may process the resource allocation in accordance with the RAT indicator. The RAT indicator may be, in one aspect, a bit in the DCI or a radio network temporary indicator (RNTI) associated with the RAT. In one aspect, the UE 115 may receive, over the single control channel 615, an NR message scheduling specific PDSCH resources for NR and an LTE message scheduling specific PDSCH resources for LTE. In another aspect, a single control message may schedule both NR and LTE PDSCH resources. In some cases, the control channel 615 may span a subset of the NR carrier 605 frequency and a number of TTIs (e.g., one symbol, two symbols, etc.). The control channel 615 may overlap in frequency with LTE carrier 610 or may not overlap in frequency with LTE carrier 610, in some cases.

Figure 7:
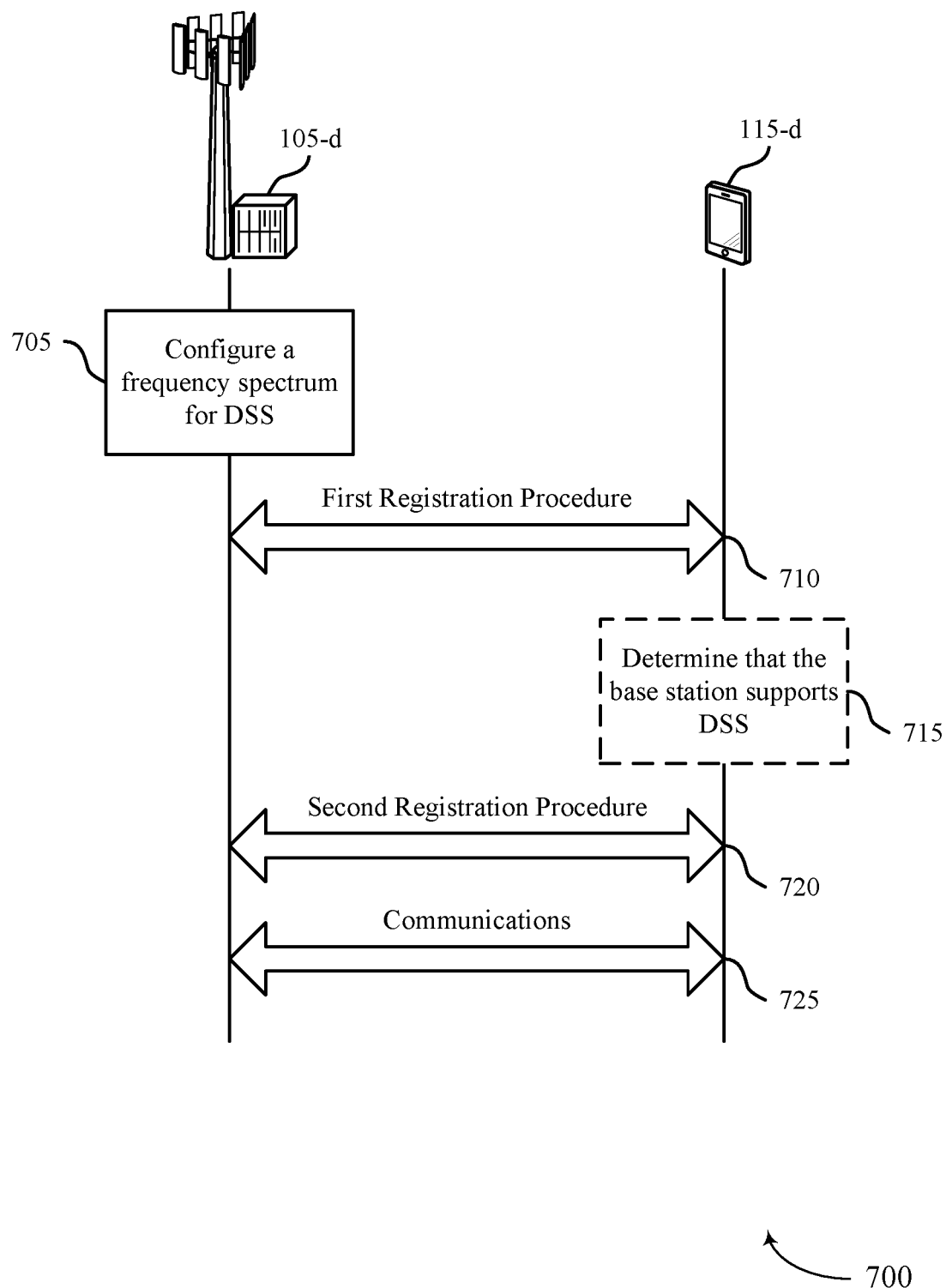
FIG. 7 illustrates aspects of a process flow that supports enhancements for multiple radio protocol DSS in accordance with aspects of the present disclosure.

FIG. 7 illustrates aspects of a process flow 700 that supports enhancements for multiple radio protocol DSS in accordance with aspects of the present disclosure. In some aspects, the process flow 700 may implement aspects of wireless communications systems 100, 200, and 500. Base station **105-*d* may support DSS between a first RAT (e.g., NR) and a second RAT (e.g., LTE) and may support dual registration by UE 115-*d* for both RATs (e.g., NR and LTE) on a cell. Base station 105-*d* and UE 115-*d* may be examples of the corresponding wireless devices described with reference to FIGS. 1 through 6**. Alternative aspects of the following may be implemented, where some steps are performed in a different order than described or are not performed at all. In some cases, steps may include additional features not mentioned below, or further steps may be added.

At 705, base station **105-*d* may configure a frequency spectrum for dynamic sharing between a first RAT (e.g., NR) and a second RAT (e.g., LTE). At 710, UE 115-*d* may perform a first registration procedure with base station 105-*d* on a first cell supporting a first RAT in the frequency spectrum. The first registration procedure may include, for example, authentication and security (e.g., key provisioning) and establishment of a default bearer for the first RAT. In the first registration procedure, the UE 115-*d* may send an attach request to the base station 105-*d* with an identifier of the UE 115-*d* (e.g., subscriber identity). The base station 105-*d* may confirm (e.g., via a core network) the subscriber identity and may establish an active bearer context for the UE 115-*d* on the first RAT. The base station 105-*d* may respond with an RRC reconfiguration complete message to complete the first registration procedure. At 715, UE 115-*d* may determine that base station 105-*d* supports dynamic sharing of the frequency spectrum between the first RAT and the second RAT. In one aspect, as part of the first registration procedure, UE 115-*d* may receive a cell identifier for base station 105-*d*, where the cell identifier indicates that the first cell supports dual registration in the dynamically shared frequency spectrum. In some cases, UE 115-*d* may cache, in local memory at the UE 115-*d*, an indication that the base station 105-*d*** supports the dynamic sharing of the frequency spectrum between the first RAT and the second RAT.

At 720, UE **115-*d* may perform a second registration procedure with base station 105-*d* on a second cell (e.g., associated with the first cell) supporting the second RAT in the frequency spectrum based on base station 105-*d* supporting DSS between the first and second RATs. The second registration procedure may include, for example, authentication and security (e.g., key provisioning) and establishment of a default bearer for the second RAT. In the second registration procedure, the UE 115**-*d* may send an attach request to the base station 105-*d* with an identifier of the UE 115-*d* (e.g., subscriber identity). The base station 105-*d* may confirm (e.g., via a core network) the subscriber identity and may establish an active bearer context for the UE 115-*d* on the second RAT. The base station 105-*d* may respond with an RRC reconfiguration complete message to complete the second registration procedure. In some aspects, the first registration procedure may be performed on a first carrier and the second registration procedure may be performed on a second carrier. Based on the DSS, the second carrier may at least partially overlap with the first carrier in the frequency spectrum. In some examples, the first carrier and the second carrier may correspond to the same carrier. Additionally or alternatively, the first cell and the second cell may correspond to the same cell.

At 725, UE 115-*d* and base station 105-*d* may communicate based on the first registration procedure and the second registration procedure (e.g., as part of a dual registration procedure). In some aspects, UE 115-*d* may perform data communications (e.g., on the first carrier) using the first RAT and may perform, at least partially concurrent to the data communications, voice communications (e.g., on the second carrier) using the second RAT. In some cases, base station 105-*d* may schedule data communications for both RATs (e.g., NR and LTE) using a single control channel. In one aspect, UE 115-*d* may receive, in a control channel for the first RAT (e.g., NR) on the first carrier, one or more control messages indicating a first set of resources in the frequency spectrum for data communications using the first RAT and a second set of resources in the frequency spectrum for data communications using the second RAT. In some aspects, the first carrier is the primary carrier for UE 115-*d*, and UE 115-*d* may use a single radio frequency transceiver to receive the first set of resources and the second set of resources.

Figure 8:
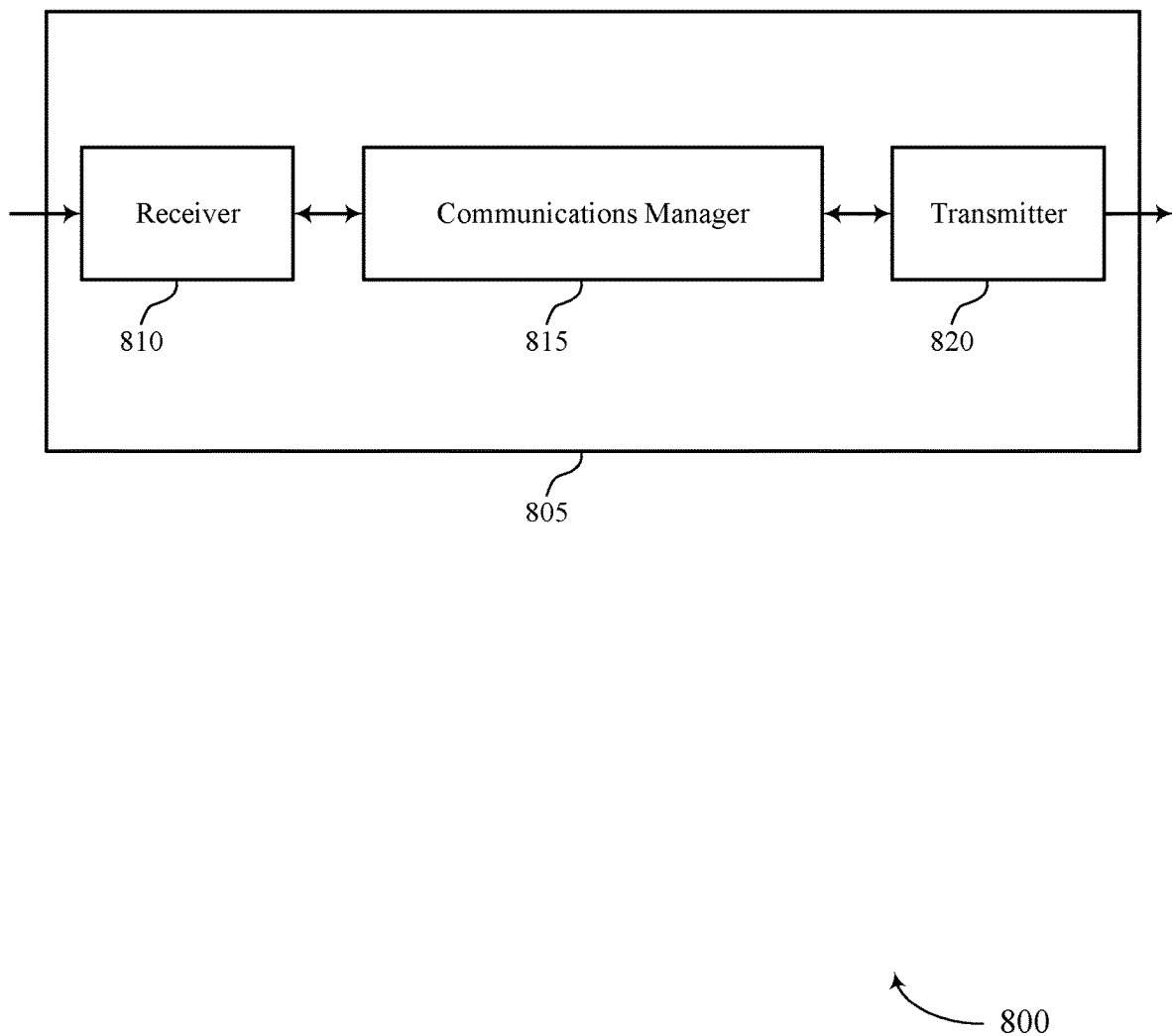
FIGS. 8 and 9 show block diagrams of devices that support enhancements for multiple radio protocol DSS in accordance with aspects of the present disclosure.

FIG. 8 shows a block diagram 800 of a device 805 that supports enhancements for multiple radio protocol DSS in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to enhancements for multiple radio protocol dynamic spectrum sharing, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may register, with a base station, on a first cell supporting a first RAT in a frequency spectrum and may register, with the base station, on a second cell supporting a second RAT different from the first RAT and at least partially overlapping with the first cell in the frequency spectrum based on the base station supporting dynamic sharing of the frequency spectrum between the first RAT and the second RAT. The communications manager 815 may further communicate with the base station based on the registering on the first cell supporting the first RAT and registering on the second cell supporting the second RAT. The communications manager 815 may be an example of aspects of the communications manager 1110 described herein.

The communications manager 815 as described herein may be implemented to realize one or more potential advantages. In some aspects, a device 805 may improve voice support based on the dual registration. In one aspect, dual registration may allow the device 805 to refrain from performing full LTE fallback procedures, mitigating the latency involved in switching from NR to LTE resources during a voice call. Accordingly, the network may provide VoNR-like performance and latency over VoLTE resources in a DSS cell based on the dual registration. Additionally or alternatively, using a single control channel for dual registration control signaling (e.g., for scheduling both LTE and NR data transmissions) may improve UE performance and reduce control signaling overhead.

Based on registering on the first cell and registering on the second cell for a first RAT and a second RAT respectively, as described herein, a processor of the device 805 may be associated with fewer processing computations and less processing time, which may result in improved power savings and increased battery life. In one aspect, by reducing the number of LTE fallback procedures, the processor may perform fewer connection procedures. Additionally or alternatively, by using a single control channel for LTE and NR scheduling, the UE may reduce the number of control channel resources to monitor after performing dual registration. As such, the device 805 may reduce the number of times that the device 805 ramps up processing units controlling the receiver 810, the communications manager 815, the transmitter 820, or a combination thereof.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some aspects, the communications manager 815, or its sub-components, may be a separate and distinct component in accordance with various aspects of the present disclosure. In some aspects, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some aspects, the transmitter 820 may be collocated with a receiver 810 in a transceiver module. In one aspect, the transmitter 820 may be an example of aspects of the transceiver 1120 described with reference to FIG. 11. The transmitter 820 may utilize a single antenna or a set of antennas.

Figure 9:
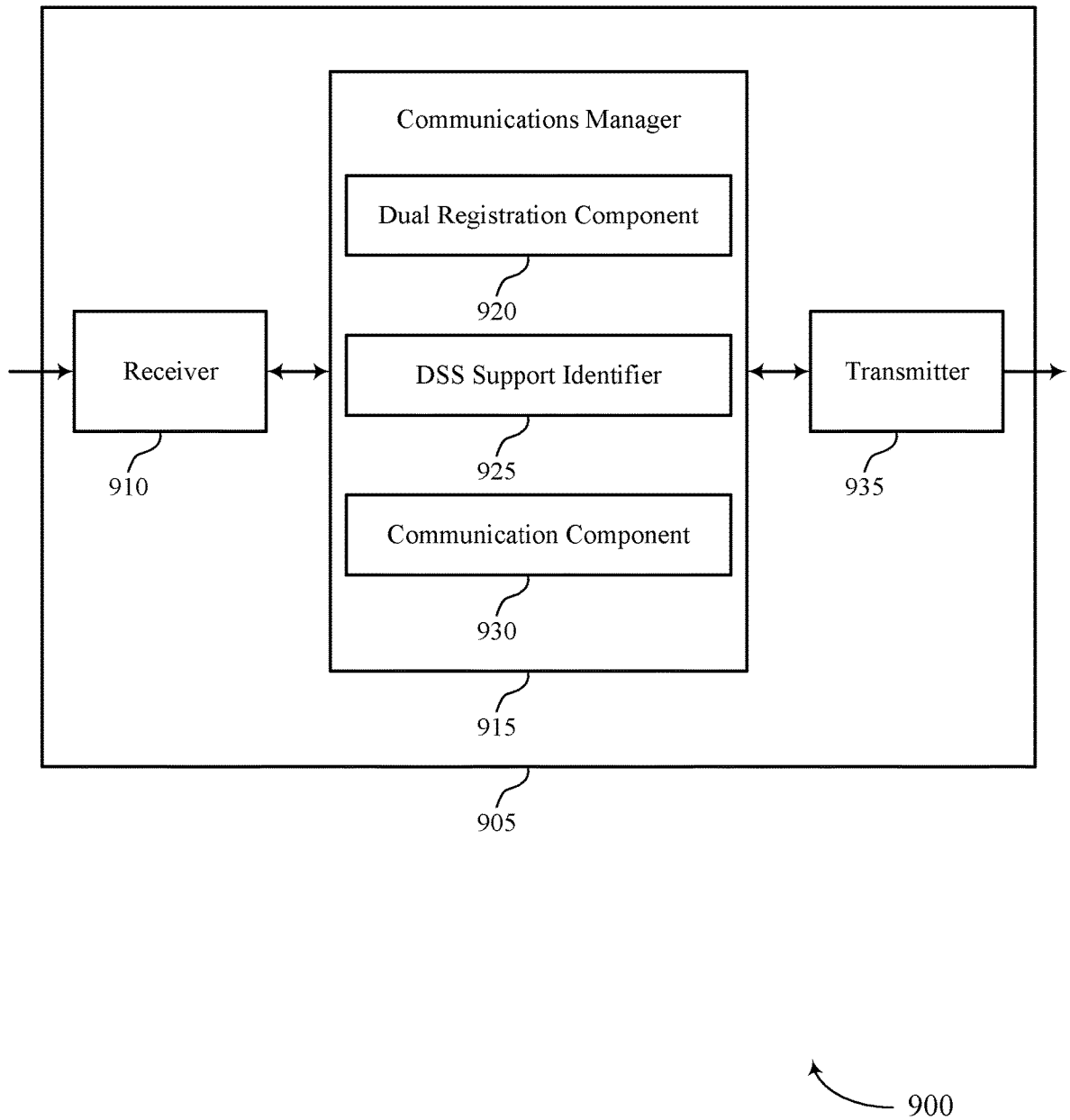

FIG. 9 shows a block diagram 900 of a device 905 that supports enhancements for multiple radio protocol DSS in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to enhancements for multiple radio protocol dynamic spectrum sharing, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a dual registration component 920, a DSS support identifier 925, and a communication component 930. The communications manager 915 may be an example of aspects of the communications manager 1110 described herein.

The dual registration component 920 may register, with a base station, on a first cell supporting a first RAT in a frequency spectrum. In some examples, a DSS support identifier 925 may determine that the base station supports dynamic sharing of the frequency spectrum between the first RAT and a second RAT. The dual registration component 920 may further register, with the base station, on a second cell supporting the second RAT different from the first RAT and at least partially overlapping with the first cell in the frequency spectrum based on the base station supporting dynamic sharing of the frequency spectrum between the first RAT and the second RAT. In one aspect, the first RAT may be a 5th generation radio technology (e.g., 5G NR), and the second RAT may be a 4th generation radio technology (e.g., LTE, LTE-A, LTE-A Pro). The communication component 930 may communicate with the base station based on the registering on the first cell supporting the first RAT and the registering on the second cell supporting the second RAT.

The transmitter 935 may transmit signals generated by other components of the device 905. In some aspects, the transmitter 935 may be collocated with a receiver 910 in a transceiver module. In one aspect, the transmitter 935 may be an example of aspects of the transceiver 1120 described with reference to FIG. 11. The transmitter 935 may utilize a single antenna or a set of antennas.

Figure 10:
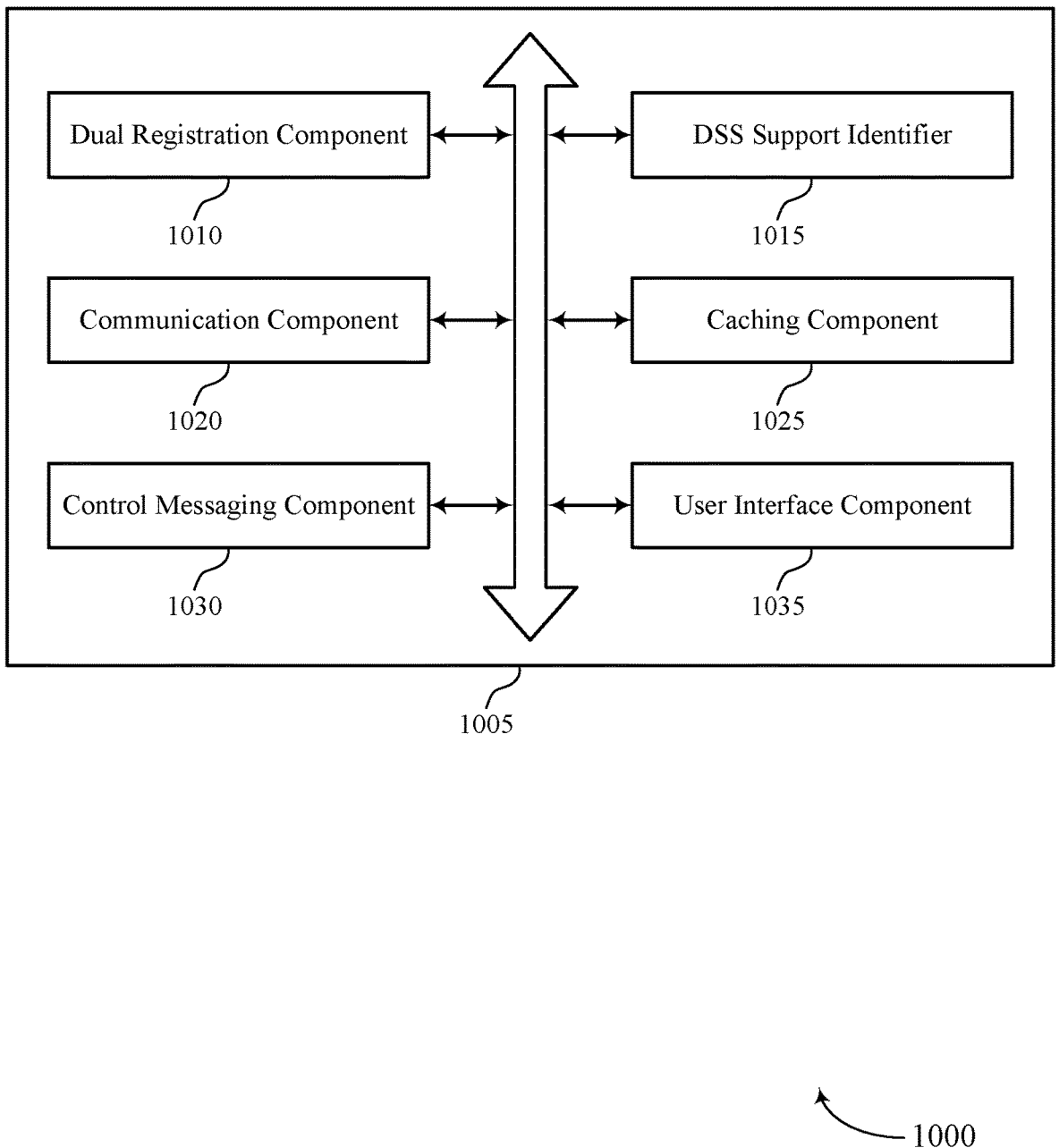
FIG. 10 shows a block diagram of a communications manager that supports enhancements for multiple radio protocol DSS in accordance with aspects of the present disclosure.

FIG. 10 shows a block diagram 1000 of a communications manager 1005 that supports enhancements for multiple radio protocol DSS in accordance with aspects of the present disclosure. The communications manager 1005 may be an example of aspects of a communications manager 815, a communications manager 915, or a communications manager 1110 described herein. The communications manager 1005 may include a dual registration component 1010, a DSS support identifier 1015, a communication component 1020, a caching component 1025, a control messaging component 1030, and a user interface component 1035. Each of these modules may communicate, directly or indirectly, with one another (e.g., via one or more buses). The communications manager 1005 may be implemented by a UE 115.

The dual registration component 1010 may register, with a base station, on a first cell supporting a first RAT in a frequency spectrum.

In some examples, the DSS support identifier 1015 may determine that the base station supports dynamic sharing of the frequency spectrum between the first RAT and a second RAT. In one aspect, the first RAT may be a 5th generation radio technology (e.g., 5G NR), and the second RAT may be a 4th generation radio technology (e.g., LTE, LTE-A, LTE-A Pro). In some aspects, the DSS support identifier 1015 may receive a cell identifier for the first cell, where the determining is based on the cell identifier. For example, the DSS support identifier 1015 may store an association (e.g., a lookup table, a formula) between one or more cell identifiers and support for DSS between the first RAT and the second RAT. The DSS support identifier 1015 may receive the cell identifier for the first cell, the second cell, or both and may determine whether the first cell, the second cell, or both support dynamic sharing of the frequency spectrum between the first RAT and a second RAT based on an association stored at the UE 115.

In some aspects, the dual registration component 1010 may further register, with the base station, on a second cell supporting a second RAT different from the first RAT and at least partially overlapping with the first cell in the frequency spectrum (e.g., where registering on the second cell in addition to registering on the first cell is based on the base station supporting dynamic sharing of the frequency spectrum between the first RAT and the second RAT). In one aspect, the first RAT may be a 5th generation radio technology (e.g., 5G NR), and the second RAT may be a 4th generation radio technology (e.g., LTE, LTE-A, LTE-A Pro). In some cases, registering on the first cell and registering on the second cell may be part of a dual registration procedure. In some cases, the first cell and the second cell may correspond to a same cell.

The communication component 1020 may communicate with the base station based on the registering on the first cell and the registering on the second cell. In some aspects, the communication component 1020 may perform data communications on the first cell using the first RAT and may perform, at least partially concurrent to performing the data communications, voice communications on the second cell using the second RAT. In some aspects, the communication component 1020 may establish a first radio bearer for the communicating with the base station using the first RAT and a second radio bearer for the communicating with the base station using the second RAT. In some aspects, the communication component 1020 may communicate with the base station on a first carrier using the first RAT based on the registering on the first cell and communicate with the base station on a second carrier using the second RAT based on the registering on the second cell. In some cases, the first carrier and the second carrier may be a same carrier.

The caching component 1025 may cache, in local memory at the UE, an indication that the base station supports the dynamic sharing of the frequency spectrum between the first RAT and the second RAT.

The control messaging component 1030 may receive, in a control channel for the first RAT, a control message indicating a first set of resources in the frequency spectrum for communications using the first RAT and a second set of resources in the frequency spectrum for communications using the second RAT. In some aspects, the control messaging component 1030 may use a single radio frequency transceiver to receive the first set of resources and the second set of resources. In some cases, the control message may be received on a primary carrier corresponding to the first RAT.

The user interface component 1035 may display, in a user interface of the UE, an icon indicating that the UE supports the dynamic sharing of the frequency spectrum between the first RAT and the second RAT.

Figure 11:
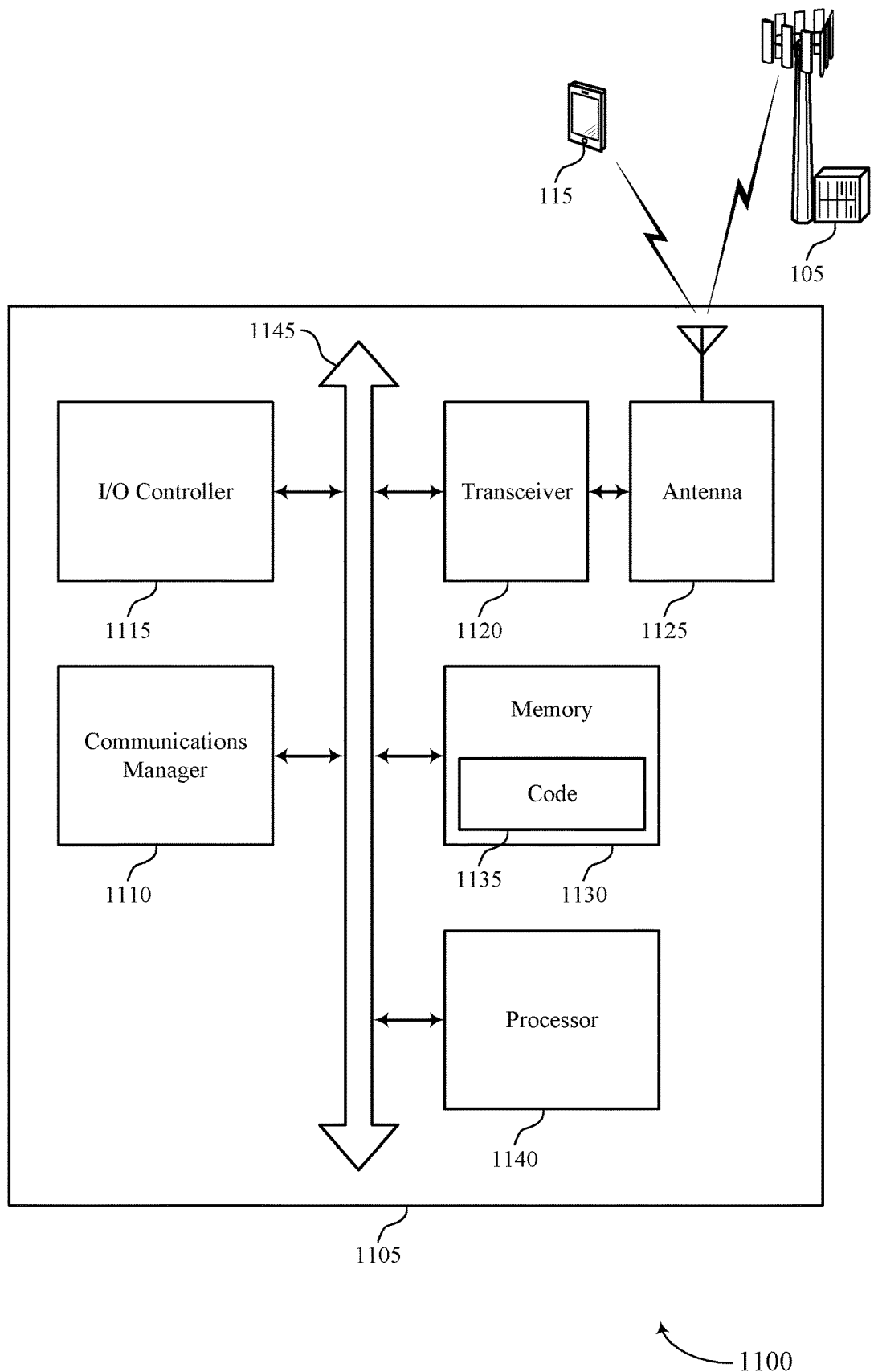
FIG. 11 shows a diagram of a system including a device that supports enhancements for multiple radio protocol DSS in accordance with aspects of the present disclosure.

FIG. 11 shows a diagram of a system 1100 including a device 1105 that supports enhancements for multiple radio protocol DSS in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may register, with a base station, on a first cell supporting a first RAT in a frequency spectrum, register, with the base station, on a second cell supporting a second RAT different from the first RAT and at least partially overlapping with the first cell in the frequency spectrum based on the base station supporting dynamic sharing of the frequency spectrum between the first RAT and the second RAT, and communicate with the base station based on the registering on the first cell supporting the first RAT and the registering on the second cell supporting the second RAT. In one aspect, the first RAT may be a 5th generation radio technology (e.g., 5G NR), and the second RAT may be a 4th generation radio technology (e.g., LTE, LTE-A, LTE-A Pro).

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. In one aspect, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting enhancements for multiple radio protocol DSS).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
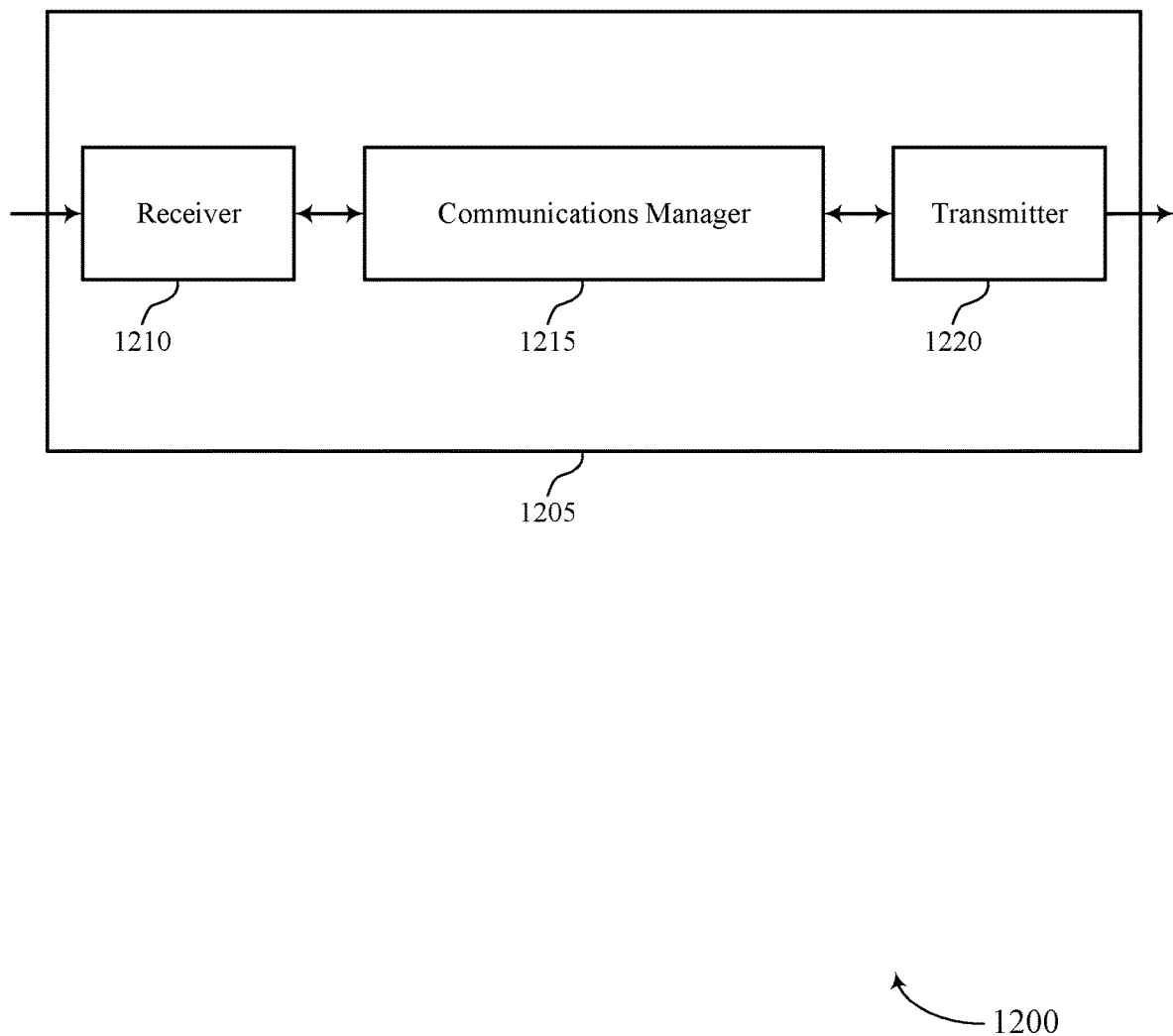
FIGS. 12 and 13 show block diagrams of devices that support enhancements for multiple radio protocol DSS in accordance with aspects of the present disclosure.

FIG. 12 shows a block diagram 1200 of a device 1205 that supports enhancements for multiple radio protocol DSS in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to enhancements for multiple radio protocol dynamic spectrum sharing, etc.). Information may be passed on to other components of the device 1205. The receiver 1210 may be an example of aspects of the transceiver 1520 described with reference to FIG. 15. The receiver 1210 may utilize a single antenna or a set of antennas.

In one aspect, the communications manager 1215 may configure a set of BWPs such that a first subset of the set of BWPs is dedicated for a first RAT and a second subset of the set of BWPs is dynamically shared between the first RAT and a second RAT, receive, from a UE, an indication of a rate matching capability of the UE, activate, for the UE, a BWP of the set of BWPs for communication based on the rate matching capability of the UE and the configuring, and transmit, to the UE, an indication of the activated BWP for communication. In one aspect, the first RAT may be a 5th generation radio technology (e.g., 5G NR), and the second RAT may be a 4th generation radio technology (e.g., LTE, LTE-A, LTE-A Pro).

In another aspect, the communications manager 1215 may communicate with a UE in a first BWP of a set of BWPs dedicated for a first RAT, identify that the UE performs a number of handover procedures greater than a threshold number of handover procedures while communicating in the first BWP, switch, based on the identifying, the UE from the first BWP to a second BWP of the set of BWPs different from the first BWP and dynamically shared between the first RAT and a second RAT, and transmit, to the UE, an indication of the second BWP for communication based on the switching.

In yet another aspect, the communications manager 1215 may configure a frequency spectrum for dynamic sharing between a first RAT and a second RAT, register a UE on a first cell supporting the first RAT in the frequency spectrum, register the UE on a second cell supporting the second RAT different from the first RAT and at least partially overlapping with the first cell in the frequency spectrum based on the configuring, and communicate with the UE based on the registering the UE on the first cell supporting the first RAT and the registering the UE on the second cell supporting the second RAT. The communications manager 1215 may be an example of aspects of the communications manager 1510 described herein.

The communications manager 1215 as described herein may be implemented to realize one or more potential advantages. In some aspects, a device 1205 may efficiently allocate the available resources by activating BWPs for UEs based on the rate matching capabilities of the UEs (e.g., along with load balancing). Specifically, if a UE does not support rate matching, there may be a significant overhead and reduction in the available resources for NR data scheduling in a DSS frequency band. As such, activating a BWP dedicated for NR for such a UE may greatly improve the efficiency of the spectrum usage. In some aspects, a device 1205 may improve mobility performance of UEs when detecting multiple handovers by switching the UEs to DSS-supported frequency bands. In some aspects, the device 1205 may improve voice support for UEs based on a dual registration procedure. In one aspect, dual registration may allow the device 1205 to provide VoNR-like performance and latency over VoLTE resources in a DSS cell. Additionally or alternatively, using a single control channel for dual registration control signaling (e.g., for scheduling both LTE and NR data transmissions) may reduce control signaling overhead.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some aspects, the communications manager 1215, or its sub-components, may be a separate and distinct component in accordance with various aspects of the present disclosure. In some aspects, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some aspects, the transmitter 1220 may be collocated with a receiver 1210 in a transceiver module. In one aspect, the transmitter 1220 may be an example of aspects of the transceiver 1520 described with reference to FIG. 15. The transmitter 1220 may utilize a single antenna or a set of antennas.

Figure 13:
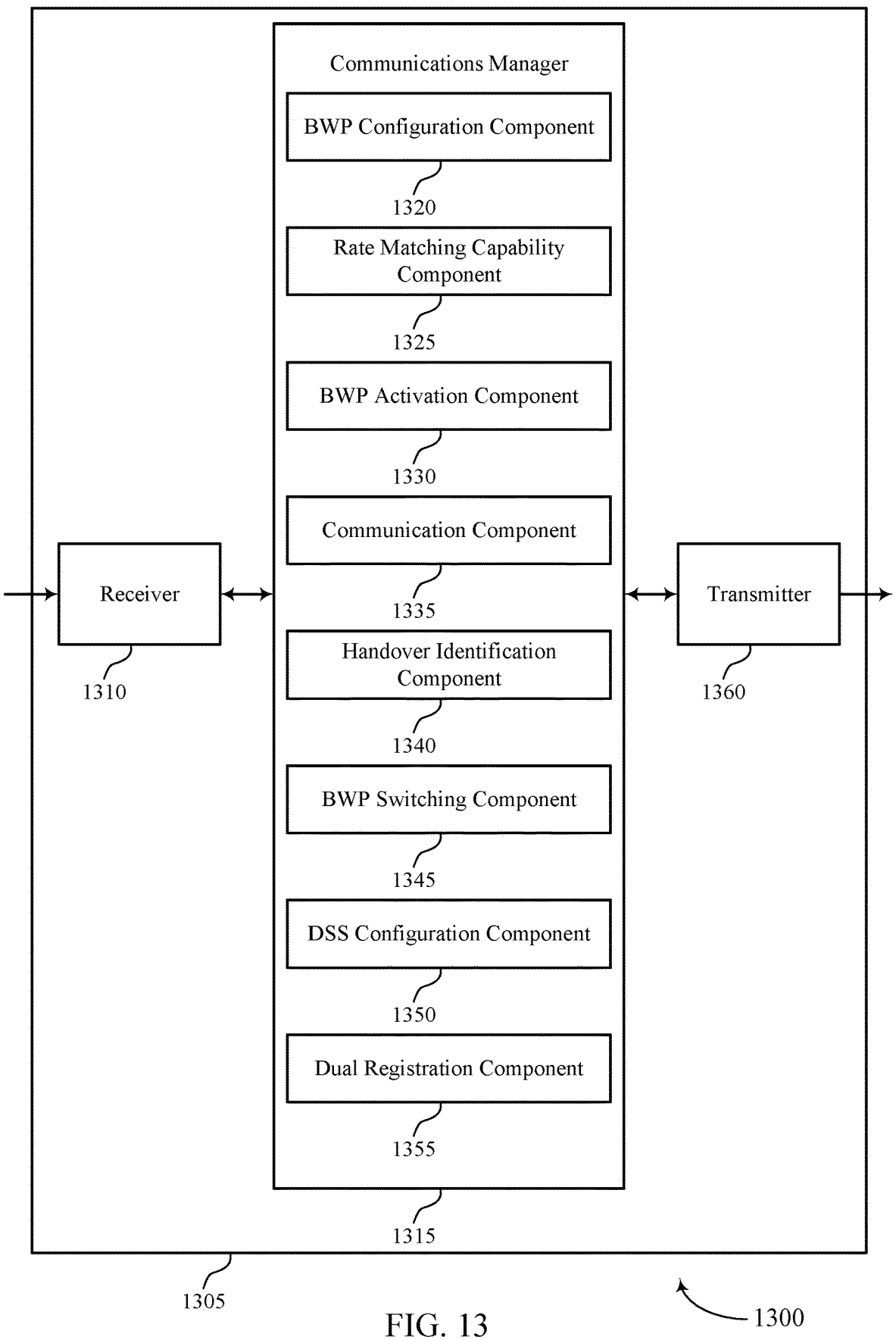

FIG. 13 shows a block diagram 1300 of a device 1305 that supports enhancements for multiple radio protocol DSS in accordance with aspects of the present disclosure. The device 1305 may be an example of aspects of a device 1205 or a base station 105 as described herein. The device 1305 may include a receiver 1310, a communications manager 1315, and a transmitter 1360. The device 1305 may also include a processor. Each of these components may be in communication with one another (e.g., via one or more buses).

The receiver 1310 may receive information such as packets, user data, or control information associated with various information channels (e.g., control channels, data channels, and information related to enhancements for multiple radio protocol dynamic spectrum sharing, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a BWP configuration component 1320, a rate matching capability component 1325, a BWP activation component 1330, a communication component 1335, a handover identification component 1340, a BWP switching component 1345, a DSS configuration component 1350, and a dual registration component 1355. The communications manager 1315 may be an example of aspects of the communications manager 1510 described herein.

The BWP configuration component 1320 may configure a set of BWPs such that a first subset of the set of BWPs is dedicated for a first RAT and a second subset of the set of BWPs is dynamically shared between the first RAT and a second RAT. In one aspect, the first RAT may be a 5th generation radio technology (e.g., 5G NR), and the second RAT may be a 4th generation radio technology (e.g., LTE, LTE-A, LTE-A Pro). The rate matching capability component 1325 may receive, from a UE, an indication of a rate matching capability of the UE. The BWP activation component 1330 may activate, for the UE, a BWP of the set of BWPs for communication based on the rate matching capability of the UE and the configuring and transmit, to the UE, an indication of the activated BWP for communication.

The communication component 1335 may communicate with a UE in a first BWP of a set of BWPs dedicated for a first RAT. The handover identification component 1340 may identify that the UE performs a number of handover procedures greater than a threshold number of handover procedures while communicating in the first BWP. The BWP switching component 1345 may switch, based on the identifying, the UE from the first BWP to a second BWP of the set of BWPs different from the first BWP and dynamically shared between the first RAT and a second RAT and transmit, to the UE, an indication of the second BWP for communication based on the switching.

The DSS configuration component 1350 may configure a frequency spectrum for dynamic sharing between a first RAT and a second RAT. The dual registration component 1355 may register a UE on a first cell supporting the first RAT in the frequency spectrum and register the UE on a second cell supporting the second RAT different from the first RAT and at least partially overlapping with the first cell in the frequency spectrum based on the configuring. The communication component 1335 may communicate with the UE based on the registering the UE on the first cell supporting the first RAT and the registering the UE on the second cell supporting the second RAT.

The transmitter 1360 may transmit signals generated by other components of the device 1305. In some aspects, the transmitter 1360 may be collocated with a receiver 1310 in a transceiver module. In one aspect, the transmitter 1360 may be an example of aspects of the transceiver 1520 described with reference to FIG. 15. The transmitter 1360 may utilize a single antenna or a set of antennas.

Figure 14:
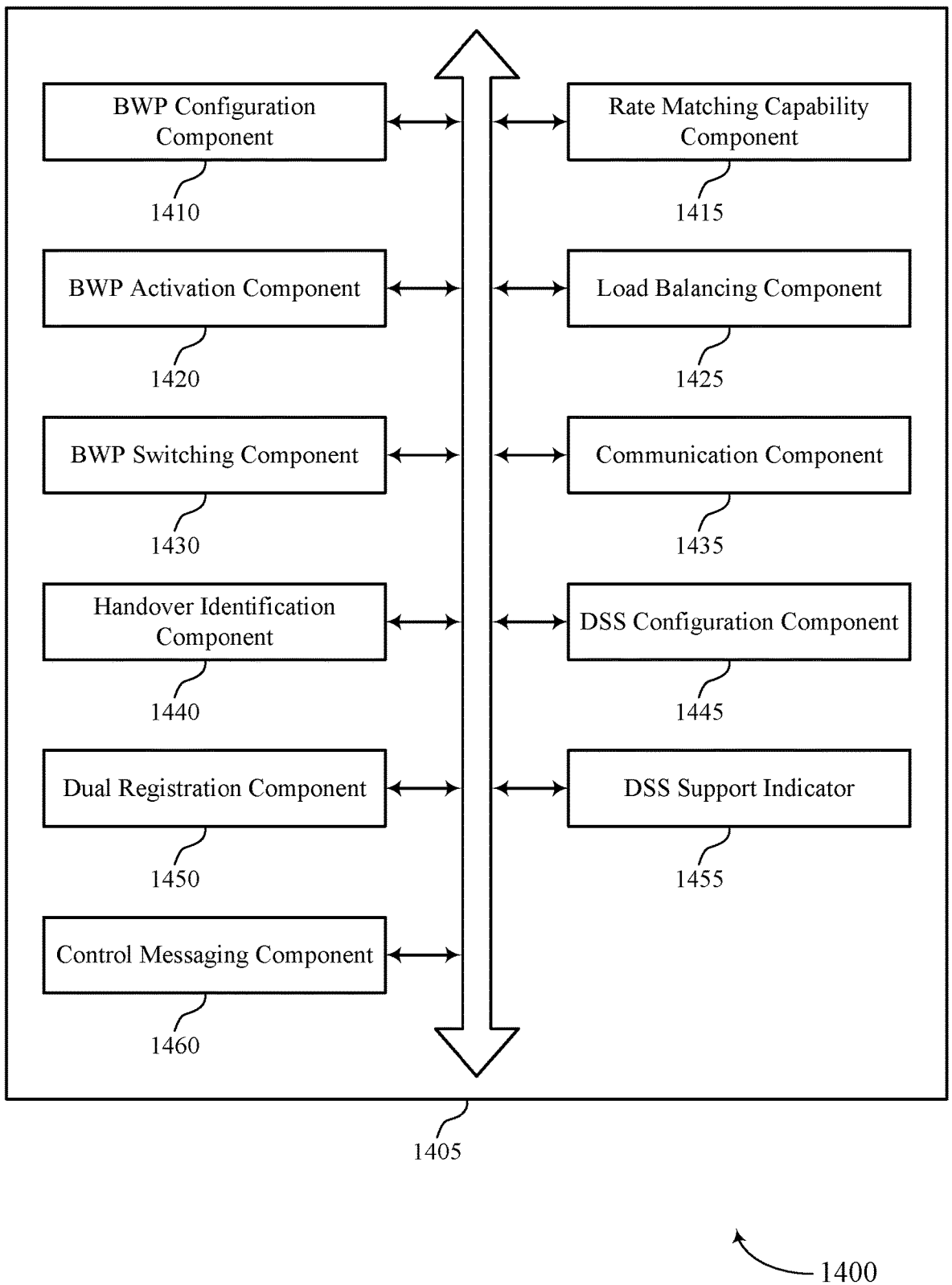
FIG. 14 shows a block diagram of a communications manager that supports enhancements for multiple radio protocol DSS in accordance with aspects of the present disclosure.

FIG. 14 shows a block diagram 1400 of a communications manager 1405 that supports enhancements for multiple radio protocol DSS in accordance with aspects of the present disclosure. The communications manager 1405 may be an example of aspects of a communications manager 1215, a communications manager 1315, or a communications manager 1510 described herein. The communications manager 1405 may include a BWP configuration component 1410, a rate matching capability component 1415, a BWP activation component 1420, a load balancing component 1425, a BWP switching component 1430, a communication component 1435, a handover identification component 1440, a DSS configuration component 1445, a dual registration component 1450, a DSS support indicator 1455, and a control messaging component 1460. Each of these modules may communicate, directly or indirectly, with one another (e.g., via one or more buses). The communications manager 1405 may be implemented by a base station 105.

In one aspect, the BWP configuration component 1410 may configure a set of BWPs such that a first subset of the set of BWPs is dedicated for a first RAT and a second subset of the set of BWPs is dynamically shared between the first RAT and a second RAT. In one aspect, the first RAT may be a 5th generation radio technology (e.g., 5G NR), and the second RAT may be a 4th generation radio technology (e.g., LTE, LTE-A, LTE-A Pro).

The rate matching capability component 1415 may receive, from a UE, an indication of a rate matching capability of the UE.

The BWP activation component 1420 may activate, for the UE, a BWP of the set of BWPs for communication based on the rate matching capability of the UE and the configuring. The BWP activation component 1420 may transmit, to the UE, an indication of the activated BWP for communication.

In some aspects, the indication of the rate matching capability of the UE indicates an absence of support for rate matching with a CRS for the second RAT (e.g., LTE). In some such aspects, the BWP activation component 1420 may activate, for the UE, the BWP from the first subset of the set of BWPs based on the absence of support for rate matching with the CRS for the second RAT. In some other aspects, the indication of the rate matching capability of the UE indicates support for rate matching with a CRS for the second RAT (e.g., LTE). In some such other aspects, the BWP activation component 1420 may activate, for the UE, the BWP from the second subset of the set of BWPs based on the UE supporting the rate matching with the CRS for the second RAT.

The load balancing component 1425 may receive, from a set of additional UEs, a set of additional indications of rate matching capabilities for the set of additional UEs. In some aspects, the load balancing component 1425 may perform a load balancing calculation for the UE and the set of additional UEs across the set of BWPs, where the activating the BWP of the set of BWPs for communication is further based on the load balancing calculation.

In some cases, the activated BWP for communication is an example of a first BWP of the set of BWPs. The BWP switching component 1430 may switch the UE from the first BWP to a second BWP of the set of BWPs different from the first BWP based on an average throughput for the UE. In some aspects, the BWP switching component 1430 may periodically switch the UE between the first BWP and the second BWP.

The communication component 1435 may communicate with the UE in the activated BWP for communication.

In another aspect, the communication component 1435 may communicate with a UE in a first BWP of a set of BWPs dedicated for a first RAT. In some cases, the first RAT may be 5G NR. The handover identification component 1440 may identify that the UE performs a number of handover procedures greater than a threshold number of handover procedures while communicating in the first BWP.

The BWP switching component 1430 may switch, based on the identifying, the UE from the first BWP to a second BWP of the set of BWPs different from the first BWP and dynamically shared between the first RAT and a second RAT. In some cases, the second RAT may be LTE. The BWP switching component 1430 may transmit, to the UE, an indication of the second BWP for communication based on the switching.

In some aspects, the BWP switching component 1430 may switch the UE from a first cell supporting the first BWP dedicated for the first RAT and a first carrier in a first frequency band to a second cell supporting the second BWP dynamically shared between the first RAT and the second RAT and a second carrier in a second frequency band that is different from the first frequency band.

In yet another aspect, the DSS configuration component 1445 may configure a frequency spectrum for dynamic sharing between a first RAT and a second RAT. In some cases, the first RAT may be 5G NR and the second RAT may be LTE.

The dual registration component 1450 may register a UE on a first cell supporting the first RAT in the frequency spectrum. The dual registration component 1450 may additionally register the UE on a second cell supporting the second RAT different from the first RAT and at least partially overlapping with the first cell in the frequency spectrum based on the configuring. In some cases, registering on the first cell supporting the first RAT and registering on the second cell supporting the second RAT may be part of a dual registration procedure for the UE. In some cases, the first cell and the second cell may correspond to a same cell.

The communication component 1435 may communicate with the UE based on the registering on the first cell supporting the first RAT and the registering on the second cell supporting the second RAT. In some aspects, the communication component 1435 may perform data communications (e.g., on a first carrier) using the first RAT and may perform, at least partially concurrent to the performing the data communications, voice communications (e.g., on a second carrier) using the second RAT. In some aspects, the communication component 1435 may direct traffic associated with the voice communications to the second RAT based on the second RAT supporting a threshold QoS for the voice communications. In some aspects, the communication component 1435 may maintain data connectivity using the first RAT during the performing the voice communications using the second RAT.

In some aspects, the communication component 1435 may communicate with the UE on a first carrier using the first RAT based on the registering on the first cell supporting the first RAT and communicate with the UE on a second carrier using the second RAT based on the registering on the second cell supporting the second RAT. The first carrier and the second carrier may be a same carrier.

The DSS support indicator 1455 may transmit a cell identifier for the first cell, the second cell, or both where the cell identifier is associated with support of the dynamic sharing between the first RAT and the second RAT, where the registering the UE on the second cell supporting the second RAT (e.g., in addition to registering the UE on the first cell supporting the first RAT) is based on the cell identifier.

The control messaging component 1460 may transmit, in a control channel for the first RAT, a control message indicating a first set of resources in the frequency spectrum for communications using the first RAT and a second set of resources in the frequency spectrum for communications using the second RAT.

Figure 15:
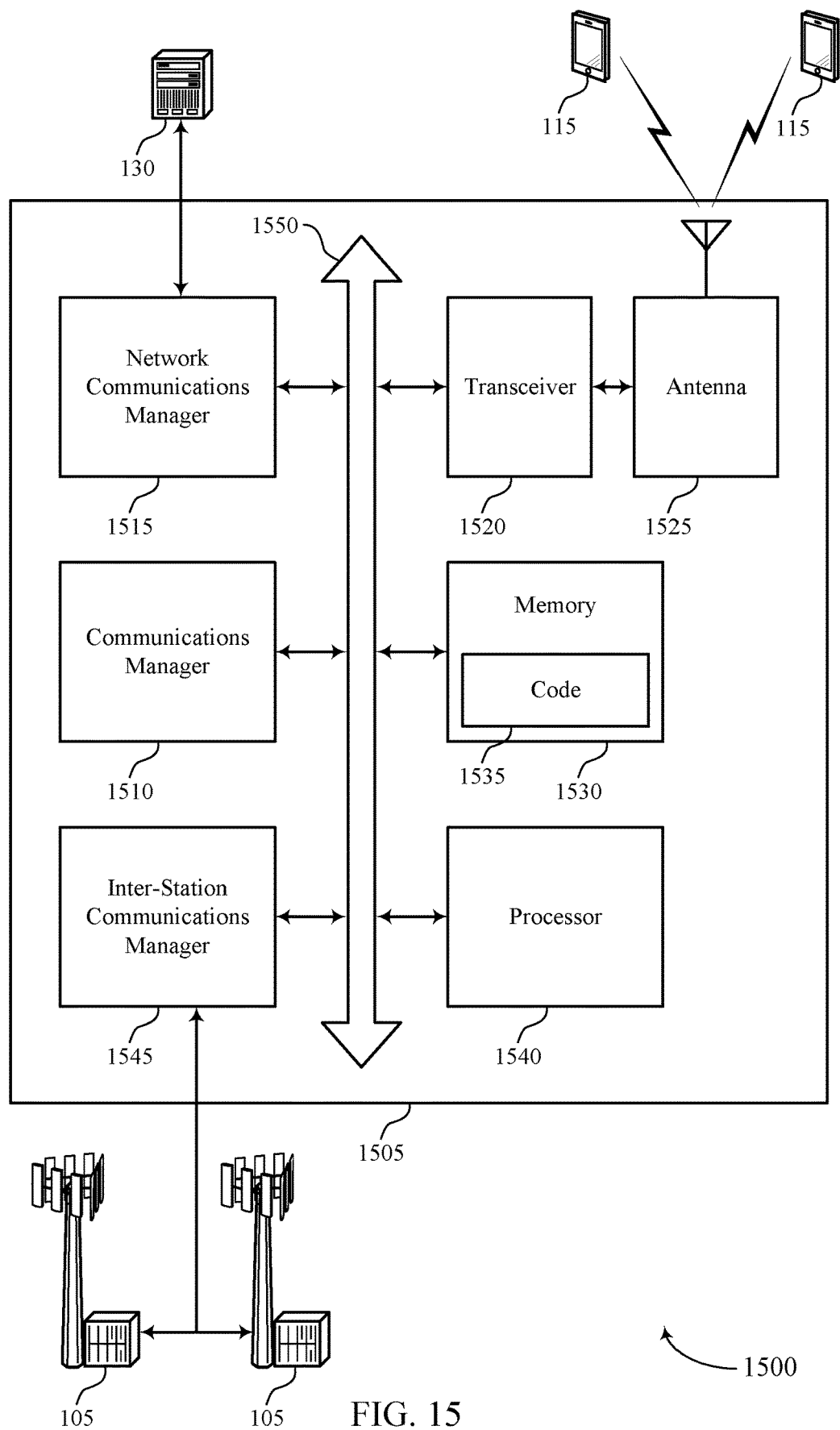
FIG. 15 shows a diagram of a system including a device that supports enhancements for multiple radio protocol DSS in accordance with aspects of the present disclosure.

FIG. 15 shows a diagram of a system 1500 including a device 1505 that supports enhancements for multiple radio protocol DSS in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

In some aspects, the communications manager 1510 may configure a set of BWPs such that a first subset of the set of BWPs is dedicated for a first RAT and a second subset of the set of BWPs is dynamically shared between the first RAT and a second RAT, receive, from a UE, an indication of a rate matching capability of the UE, activate, for the UE, a BWP of the set of BWPs for communication based on the rate matching capability of the UE and the configuring, and transmit, to the UE, an indication of the activated BWP for communication. In one aspect, the first RAT may be a 5th generation radio technology (e.g., 5G NR), and the second RAT may be a 4th generation radio technology (e.g., LTE, LTE-A, LTE-A Pro).

Additionally or alternatively, the communications manager 1510 may communicate with a UE in a first BWP of a set of BWPs dedicated for a first RAT, identify that the UE performs a number of handover procedures greater than a threshold number of handover procedures while communicating in the first BWP, switch, based on the identifying, the UE from the first BWP to a second BWP of the set of BWPs different from the first BWP and dynamically shared between the first RAT and a second RAT, and transmit, to the UE, an indication of the second BWP for communication based on the switching.

Further, additionally or alternatively, the communications manager 1510 may configure a frequency spectrum for dynamic sharing between a first RAT and a second RAT, register a UE on a first cell supporting the first RAT in the frequency spectrum, register the UE on a second cell supporting the second RAT different from the first RAT and at least partially overlapping with the first cell in the frequency spectrum based on the configuring, and communicate with the UE based on the registering the UE on the first cell supporting the first RAT and the registering the UE on the second cell supporting the second RAT.

The network communications manager 1515 may manage communications with the core network 130 (e.g., via one or more wired backhaul links). In one aspect, the network communications manager 1515 may manage the transfer of data communications for client devices, such as one or more UEs 115.

The transceiver 1520 may communicate bi-directionally, via one or more antennas, wired, or wireless links as described above. In one aspect, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting enhancements for multiple radio protocol DSS).

The inter-station communications manager 1545 may manage communications with other base station 105 and may include a controller or scheduler for controlling communications with UEs 115 in cooperation with other base stations 105. In one aspect, the inter-station communications manager 1545 may coordinate scheduling for transmissions to UEs 115 for various interference mitigation techniques such as beamforming or joint transmission. In some aspects, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
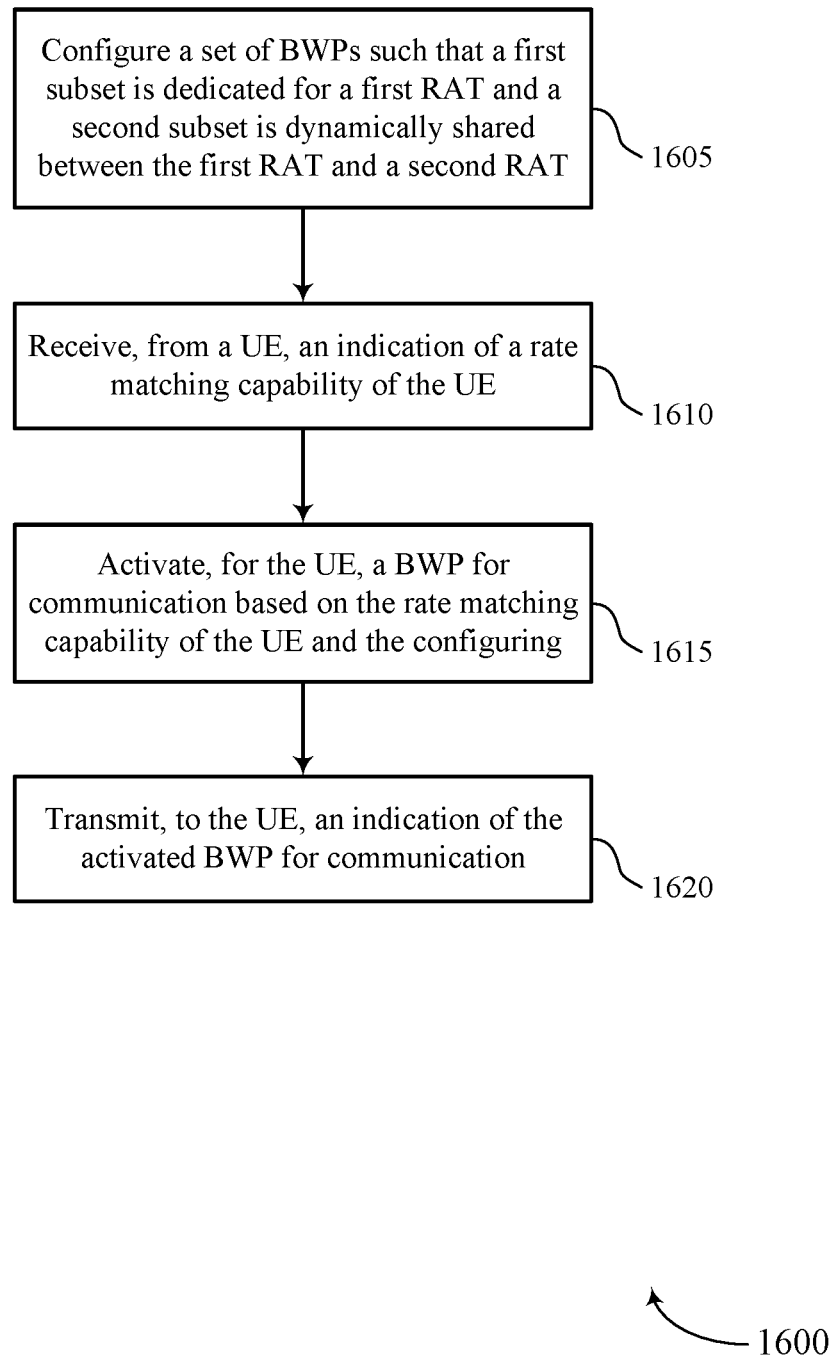
FIGS. 16 through 19 show flowcharts illustrating methods that support enhancements for multiple radio protocol DSS in accordance with aspects of the present disclosure.

FIG. 16 shows a flowchart illustrating a method 1600 that supports enhancements for multiple radio protocol DSS in accordance with aspects of the present disclosure. The operations of method 1600 may be implemented by a base station 105 or its components as described herein. In one aspect, the operations of method 1600 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 1605, the base station may configure a set of BWPs such that a first subset of the set of BWPs is dedicated for a first RAT and a second subset of the set of BWPs is dynamically shared between the first RAT and a second RAT. In one aspect, the first RAT may be a 5th generation radio technology (e.g., 5G NR), and the second RAT may be a 4th generation radio technology (e.g., LTE, LTE-A, LTE-A Pro). The operations of 1605 may be performed according to the methods described herein. In some aspects, aspects of the operations of 1605 may be performed by a BWP configuration component as described with reference to FIGS. 12 through 15.

At 1610, the base station may receive, from a UE, an indication of a rate matching capability of the UE. The operations of 1610 may be performed according to the methods described herein. In some aspects, aspects of the operations of 1610 may be performed by a rate matching capability component as described with reference to FIGS. 12 through 15.

At 1615, the base station may activate, for the UE, a BWP of the set of BWPs for communication based on the rate matching capability of the UE and the configuring. The operations of 1615 may be performed according to the methods described herein. In some aspects, aspects of the operations of 1615 may be performed by a BWP activation component as described with reference to FIGS. 12 through 15.

At 1620, the base station may transmit, to the UE, an indication of the activated BWP for communication. The operations of 1620 may be performed according to the methods described herein. In some aspects, aspects of the operations of 1620 may be performed by a BWP activation component as described with reference to FIGS. 12 through 15.

Figure 17:
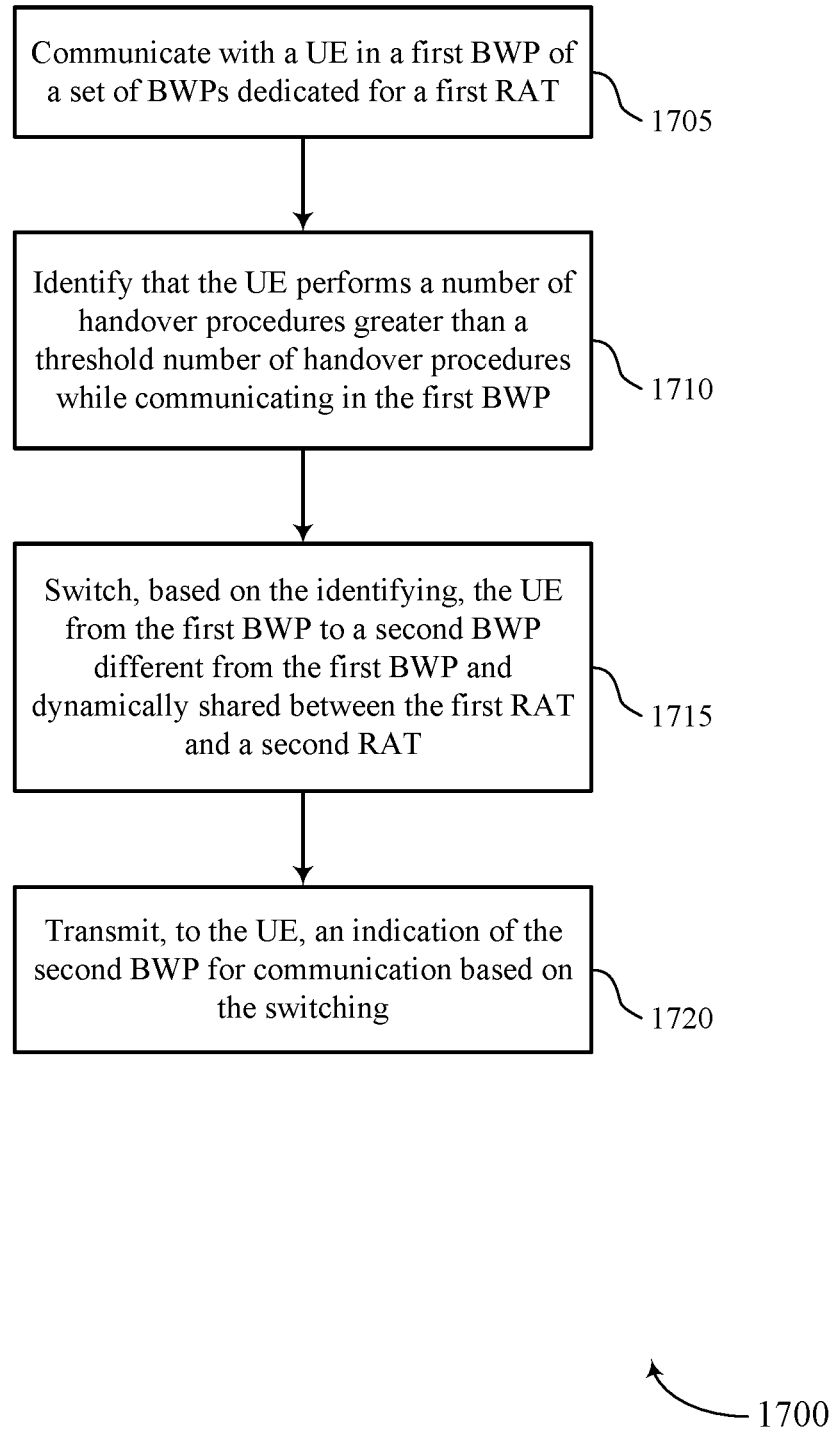

FIG. 17 shows a flowchart illustrating a method 1700 that supports enhancements for multiple radio protocol DSS in accordance with aspects of the present disclosure. The operations of method 1700 may be implemented by a base station 105 or its components as described herein. In one aspect, the operations of method 1700 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 1705, the base station may communicate with a UE in a first BWP of a set of BWPs dedicated for a first RAT. The operations of 1705 may be performed according to the methods described herein. In some aspects, aspects of the operations of 1705 may be performed by a communication component as described with reference to FIGS. 12 through 15.

At 1710, the base station may identify that the UE performs a number of handover procedures greater than a threshold number of handover procedures while communicating in the first BWP. The operations of 1710 may be performed according to the methods described herein. In some aspects, aspects of the operations of 1710 may be performed by a handover identification component as described with reference to FIGS. 12 through 15.

At 1715, the base station may switch, based on the identifying, the UE from the first BWP to a second BWP of the set of BWPs different from the first BWP and dynamically shared between the first RAT and a second RAT. In one aspect, the first RAT may be a 5th generation radio technology (e.g., 5G NR), and the second RAT may be a 4th generation radio technology (e.g., LTE, LTE-A, LTE-A Pro). The operations of 1715 may be performed according to the methods described herein. In some aspects, aspects of the operations of 1715 may be performed by a BWP switching component as described with reference to FIGS. 12 through 15.

At 1720, the base station may transmit, to the UE, an indication of the second BWP for communication based on the switching. The operations of 1720 may be performed according to the methods described herein. In some aspects, aspects of the operations of 1720 may be performed by a BWP switching component as described with reference to FIGS. 12 through 15.

Figure 18:
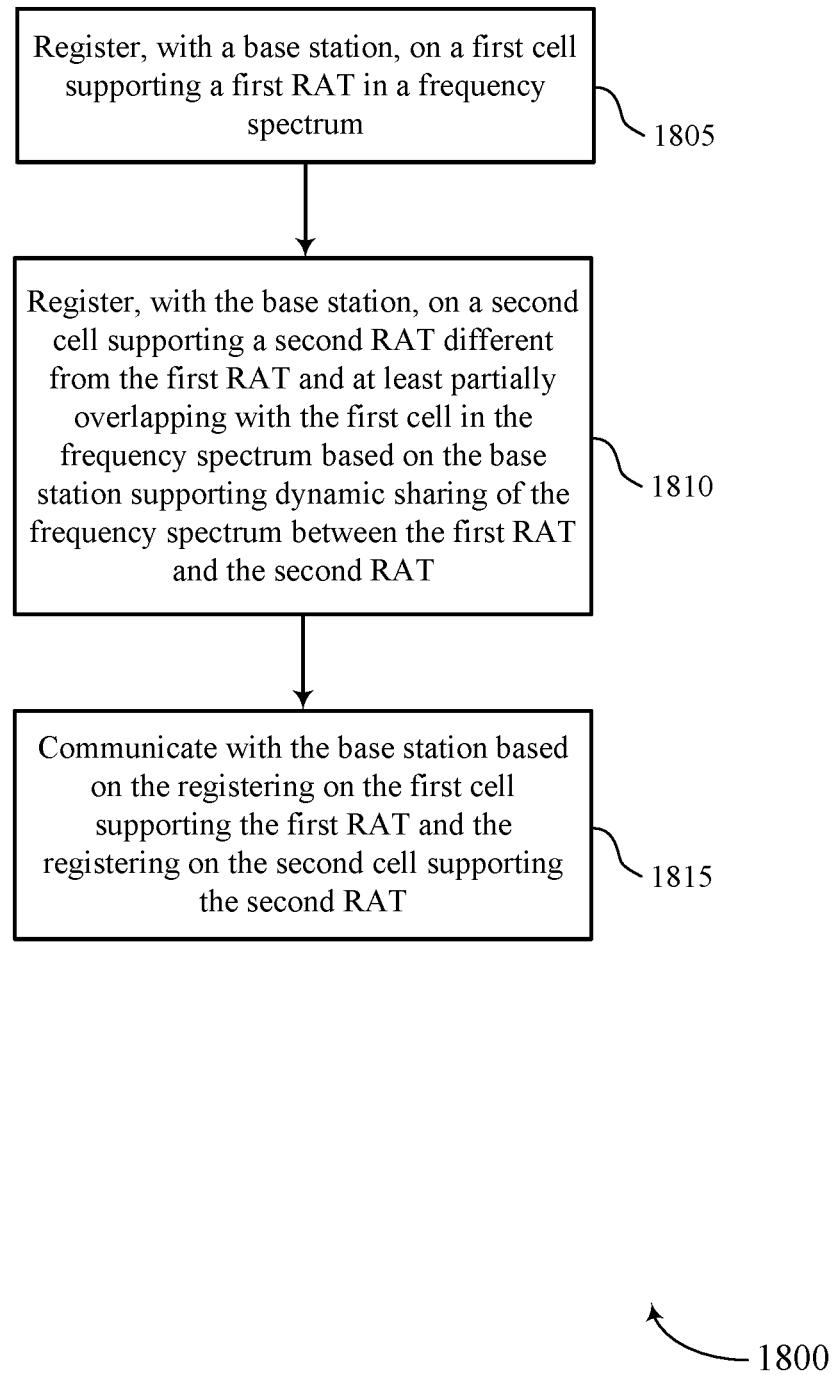

FIG. 18 shows a flowchart illustrating a method 1800 that supports enhancements for multiple radio protocol DSS in accordance with aspects of the present disclosure. The operations of method 1800 may be implemented by a UE 115 or its components as described herein. In one aspect, the operations of method 1800 may be performed by a communications manager as described with reference to FIGS. 8 through 11. In some aspects, a UE may execute a set of instructions to control the functional elements of the UE to perform the functions described below. Additionally or alternatively, a UE may perform aspects of the functions described below using special-purpose hardware.

At 1805, the UE may register, with a base station, on a first cell supporting a first RAT in a frequency spectrum. The operations of 1805 may be performed according to the methods described herein. In some aspects, aspects of the operations of 1805 may be performed by a dual registration component as described with reference to FIGS. 8 through 11.

At 1810, the UE may register, with the base station, on a second cell supporting a second RAT different from the first RAT and at least partially overlapping with the first cell in the frequency spectrum based on the base station supporting dynamic sharing of the frequency spectrum between the first RAT and the second RAT. In one aspect, the first RAT may be a 5th generation radio technology (e.g., 5G NR), and the second RAT may be a 4th generation radio technology (e.g., LTE, LTE-A, LTE-A Pro). The operations of 1810 may be performed according to the methods described herein. In some aspects, aspects of the operations of 1810 may be performed by a dual registration component as described with reference to FIGS. 8 through 11.

At 1815, the UE may communicate with the base station based on the registering on the first cell supporting the first RAT and the registering on the second cell supporting the second RAT. The operations of 1815 may be performed according to the methods described herein. In some aspects, aspects of the operations of 1815 may be performed by a communication component as described with reference to FIGS. 8 through 11.

Figure 19:
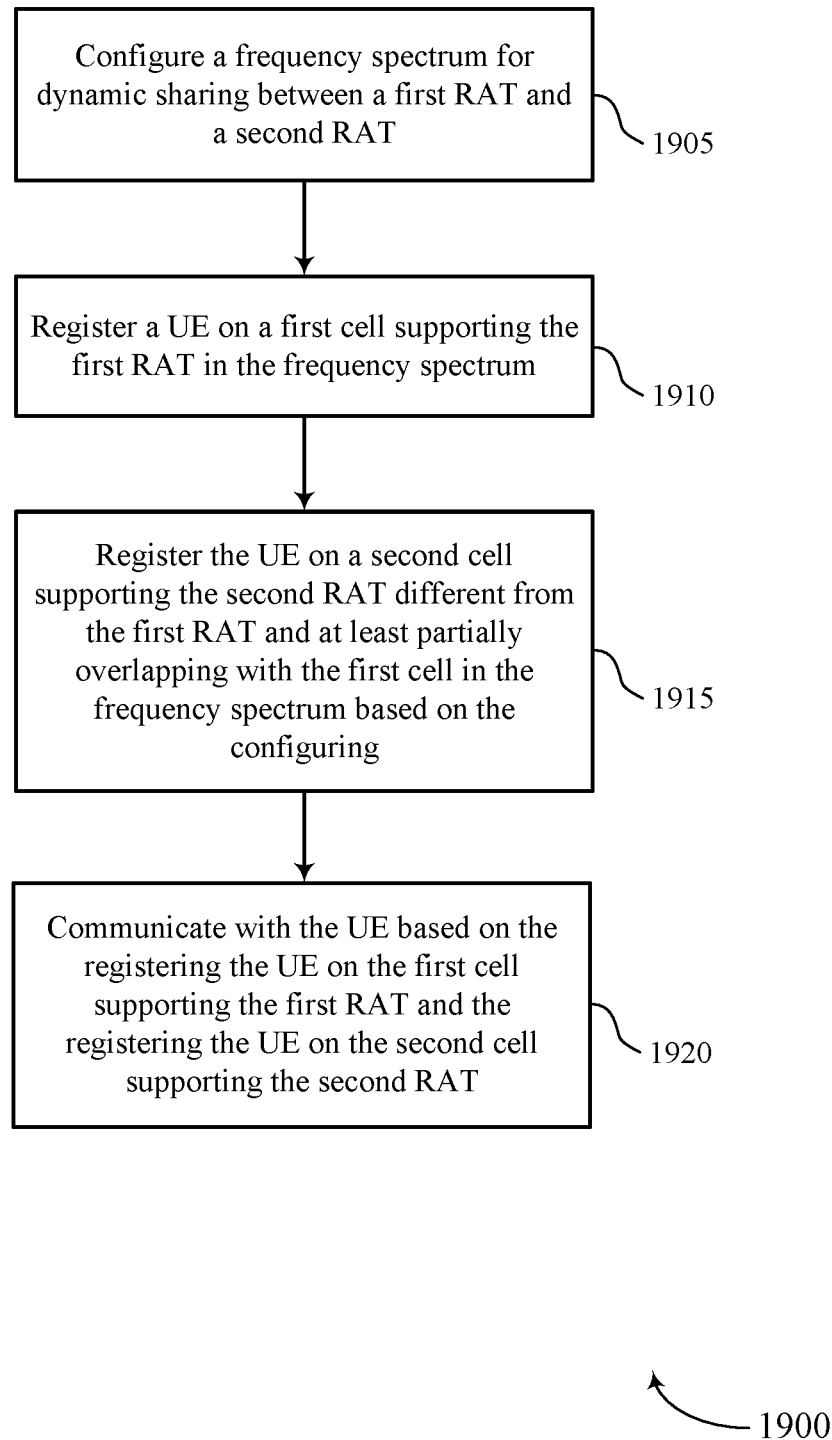

FIG. 19 shows a flowchart illustrating a method 1900 that supports enhancements for multiple radio protocol DSS in accordance with aspects of the present disclosure. The operations of method 1900 may be implemented by a base station 105 or its components as described herein. In one aspect, the operations of method 1900 may be performed by a communications manager as described with reference to FIGS. 12 through 15. In some aspects, a base station may execute a set of instructions to control the functional elements of the base station to perform the functions described below. Additionally or alternatively, a base station may perform aspects of the functions described below using special-purpose hardware.

At 1905, the base station may configure a frequency spectrum for dynamic sharing between a first RAT and a second RAT. In one aspect, the first RAT may be a 5th generation radio technology (e.g., 5G NR), and the second RAT may be a 4th generation radio technology (e.g., LTE, LTE-A, LTE-A Pro). The operations of 1905 may be performed according to the methods described herein. In some aspects, aspects of the operations of 1905 may be performed by a DSS configuration component as described with reference to FIGS. 12 through 15.

At 1910, the base station may register a UE on a first cell supporting the first RAT in the frequency spectrum. The operations of 1910 may be performed according to the methods described herein. In some aspects, aspects of the operations of 1910 may be performed by a dual registration component as described with reference to FIGS. 12 through 15.

At 1915, the base station may register, based on the configuring, the UE on a second cell supporting the second RAT different from the first RAT and at least partially overlapping with the first cell in the frequency spectrum based on the configuring. The operations of 1915 may be performed according to the methods described herein. In some aspects, aspects of the operations of 1915 may be performed by a dual registration component as described with reference to FIGS. 12 through 15.

At 1920, the base station may communicate with the UE based on the registering the UE on the first cell supporting the first RAT and the registering the UE on the second cell supporting the second RAT. The operations of 1920 may be performed according to the methods described herein. In some aspects, aspects of the operations of 1920 may be performed by a communication component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications implemented by a base station, comprising: configuring a plurality of bandwidth parts such that a first subset of the plurality of bandwidth parts is dedicated for a first radio access technology and a second subset of the plurality of bandwidth parts is dynamically shared between the first radio access technology and a second radio access technology; receiving, from a UE, an indication of a rate matching capability of the UE; activating, for the UE, a bandwidth part of the plurality of bandwidth parts for communication based at least in part on the rate matching capability of the UE and the configuring; and transmitting, to the UE, an indication of the activated bandwidth part for communication.

Aspect 2: The method of aspect 1, wherein the indication of the rate matching capability of the UE indicates an absence of support for rate matching with a cell-specific reference signal for the second radio access technology and the activating further comprises: activating, for the UE, the bandwidth part from the first subset of the plurality of bandwidth parts based at least in part on the absence of support for rate matching with the cell-specific reference signal for the second radio access technology.

Aspect 3: The method of any of aspects 1 through 2, wherein the indication of the rate matching capability of the UE indicates support for rate matching with a cell-specific reference signal for the second radio access technology and the activating further comprises: activating, for the UE, the bandwidth part from the second subset of the plurality of bandwidth parts based at least in part on the UE supporting the rate matching with the cell-specific reference signal for the second radio access technology.

Aspect 4: The method of any of aspects 1 through 3, wherein the first radio access technology comprises a fifth generation radio technology; and the second radio access technology comprises a long term evolution technology.

Aspect 5: The method of any of aspects 1 through 4, further comprising: receiving, from a plurality of additional UEs, a plurality of additional indications of rate matching capabilities for the plurality of additional UEs; and performing a load balancing calculation for the UE and the plurality of additional UEs across the plurality of bandwidth parts, wherein the activating the bandwidth part of the plurality of bandwidth parts for communication is further based at least in part on the load balancing calculation.

Aspect 6: The method of any of aspects 1 through 5, wherein the activated bandwidth part for communication comprises a first bandwidth part of the plurality of bandwidth parts, the method further comprising: switching the UE from the first bandwidth part to a second bandwidth part of the plurality of bandwidth parts different from the first bandwidth part based at least in part on an average throughput for the UE.

Aspect 7: The method of aspect 6, wherein the switching further comprises: periodically switching the UE between the first bandwidth part and the second bandwidth part.

Aspect 8: The method of any of aspects 1 through 7, further comprising: communicating with the UE in the activated bandwidth part for communication.

Aspect 9: A method for wireless communications implemented by a base station, comprising: communicating with a UE in a first bandwidth part of a plurality of bandwidth parts dedicated for a first radio access technology; identifying that the UE performs a number of handover procedures greater than a threshold number of handover procedures while communicating in the first bandwidth part; switching, based at least in part on the identifying, the UE from the first bandwidth part to a second bandwidth part of the plurality of bandwidth parts different from the first bandwidth part and dynamically shared between the first radio access technology and a second radio access technology; and transmitting, to the UE, an indication of the second bandwidth part for communication based at least in part on the switching.

Aspect 10: The method of aspect 9, wherein the switching further comprises: switching the UE from a first cell supporting the first bandwidth part dedicated for the first radio access technology in a first frequency band to a second cell supporting the second bandwidth part dynamically shared between the first radio access technology and the second radio access technology in a second frequency band that is different from the first frequency band.

Aspect 11: The method of any of aspects 9 through 10, wherein the first radio access technology comprises a fifth generation radio technology; and the second radio access technology comprises a long term evolution technology.

Aspect 12: A method for wireless communications implemented by a UE, comprising: registering, with a base station, on a first cell supporting a first radio access technology in a frequency spectrum; registering, with the base station, on a second cell supporting a second radio access technology different from the first radio access technology and at least partially overlapping with the first cell in the frequency spectrum based at least in part on the base station supporting dynamic sharing of the frequency spectrum between the first radio access technology and the second radio access technology; and communicating with the base station based at least in part on the registering on the first cell supporting the first radio access technology and the registering on the second cell supporting the second radio access technology.

Aspect 13: The method of aspect 12, further comprising: receiving a cell identifier for the first cell, wherein the cell identifier indicates that the base station supports the dynamic sharing of the frequency spectrum between the first radio access technology and the second radio access technology.

Aspect 14: The method of any of aspects 12 through 13, wherein the communicating comprises: performing data communications on the first cell using the first radio access technology; and performing, at least partially concurrent to the performing the data communications, voice communications on the second cell using the second radio access technology.

Aspect 15: The method of any of aspects 12 through 14, further comprising: establishing a first radio bearer for the communicating with the base station using the first radio access technology and a second radio bearer for the communicating with the base station using the second radio access technology.

Aspect 16: The method of any of aspects 12 through 15, further comprising: caching, in local memory at the UE, an indication that the base station supports the dynamic sharing of the frequency spectrum between the first radio access technology and the second radio access technology.

Aspect 17: The method of any of aspects 12 through 16, further comprising: receiving, in a control channel for the first radio access technology, a control message indicating a first set of resources in the frequency spectrum for communications using the first radio access technology and a second set of resources in the frequency spectrum for communications using the second radio access technology.

Aspect 18: The method of aspect 17, wherein the control message is received on a primary carrier corresponding to the first radio access technology.

Aspect 19: The method of any of aspects 17 through 18, further comprising: using a single radio frequency transceiver to receive the first set of resources and the second set of resources.

Aspect 20: The method of any of aspects 12 through 19, wherein the registering on the first cell supporting the first radio access technology and the registering on the second cell supporting the second radio access technology comprise a dual registration procedure.

Aspect 21: The method of any of aspects 12 through 20, further comprising: displaying, in a user interface of the UE, an icon indicating that the UE supports the dynamic sharing of the frequency spectrum between the first radio access technology and the second radio access technology.

Aspect 22: The method of any of aspects 12 through 21, wherein the communicating comprises: communicating with the base station on a first carrier using the first radio access technology based at least in part on the registering on the first cell supporting the first radio access technology; and communicating with the base station on a second carrier using the second radio access technology based at least in part on the registering on the second cell supporting the second radio access technology.

Aspect 23: The method of aspect 22, wherein the first carrier and the second carrier are a same carrier.

Aspect 24: The method of any of aspects 12 through 23, wherein the first radio access technology comprises a fifth generation radio technology; and the second radio access technology comprises a long term evolution technology.

Aspect 25: A method for wireless communications implemented by a base station, comprising: configuring a frequency spectrum for dynamic sharing between a first radio access technology and a second radio access technology; registering a UE on a first cell supporting the first radio access technology in the frequency spectrum; registering the UE on a second cell supporting the second radio access technology different from the first radio access technology and at least partially overlapping with the first cell in the frequency spectrum based at least in part on the configuring; and communicating with the UE based at least in part on the registering the UE on the first cell supporting the first radio access technology and the registering the UE on the second cell supporting the second radio access technology.

Aspect 26: The method of aspect 25, further comprising: transmitting a cell identifier for the first cell, the second cell, or both, wherein the cell identifier is associated with support of the dynamic sharing between the first radio access technology and the second radio access technology, wherein the registering the UE on the second cell supporting the second radio access technology is based at least in part on the cell identifier.

Aspect 27: The method of any of aspects 25 through 26, wherein the communicating comprises: performing data communications on the first cell using the first radio access technology; and performing, at least partially concurrent to the performing the data communications, voice communications on the second cell using the second radio access technology.

Aspect 28: The method of aspect 27, further comprising: directing traffic associated with the voice communications to the second radio access technology based at least in part on the second radio access technology supporting a threshold quality of service for the voice communications.

Aspect 29: The method of any of aspects 27 through 28, further comprising: maintaining data connectivity using the first radio access technology during the performing the voice communications using the second radio access technology.

Aspect 30: The method of any of aspects 25 through 29, further comprising: transmitting, in a control channel for the first radio access technology, a control message indicating a first set of resources in the frequency spectrum for communications using the first radio access technology and a second set of resources in the frequency spectrum for communications using the second radio access technology.

Aspect 31: The method of any of aspects 25 through 30, wherein the registering the UE on the first cell supporting the first radio access technology and the registering the UE on the second cell supporting the second radio access technology comprise a dual registration procedure for the UE.

Aspect 32: The method of any of aspects 25 through 31, wherein the communicating comprises: communicating with the UE on a first carrier using the first radio access technology based at least in part on the registering the UE on the first cell supporting the first radio access technology; and communicating with the UE on a second carrier using the second radio access technology based at least in part on the registering the UE on the second cell supporting the second radio access technology.

Aspect 33: The method of aspect 32, wherein the first carrier and the second carrier are a same carrier.

Aspect 34: The method of any of aspects 25 through 33, wherein the first radio access technology comprises a fifth generation radio technology; and the second radio access technology comprises a long term evolution technology.

Aspect 35: An apparatus for wireless communications implemented by a base station, comprising a processor; memory coupled with the processor; and instructions stored in the memory and executable by the processor to cause the apparatus to perform a method of any of aspects 1 through 8.

Aspect 36: An apparatus for wireless communications implemented by a base station, comprising at least one means for performing a method of any of aspects 1 through 8.

Aspect 37: A non-transitory computer-readable medium storing code for wireless communications implemented by a base station, the code comprising instructions executable by a processor to perform a method of any of aspects 1 through 8.

Aspect 38: An apparatus for wireless communications implemented by a base station, comprising a processor; memory coupled with the processor; and instructions stored in the memory and executable by the processor to cause the apparatus to perform a method of any of aspects 9 through 11.

Aspect 39: An apparatus for wireless communications implemented by a base station, comprising at least one means for performing a method of any of aspects 9 through 11.

Aspect 40: A non-transitory computer-readable medium storing code for wireless communications implemented by a base station, the code comprising instructions executable by a processor to perform a method of any of aspects 9 through 11.

Aspect 41: An apparatus for wireless communications implemented by a UE, comprising a processor; memory coupled with the processor; and instructions stored in the memory and executable by the processor to cause the apparatus to perform a method of any of aspects 12 through 24.

Aspect 42: An apparatus for wireless communications implemented by a UE, comprising at least one means for performing a method of any of aspects 12 through 24.

Aspect 43: A non-transitory computer-readable medium storing code for wireless communications implemented by a UE, the code comprising instructions executable by a processor to perform a method of any of aspects 12 through 24.

Aspect 44: An apparatus for wireless communications implemented by a base station, comprising a processor; memory coupled with the processor; and instructions stored in the memory and executable by the processor to cause the apparatus to perform a method of any of aspects 25 through 34.

Aspect 45: An apparatus for wireless communications implemented by a base station, comprising at least one means for performing a method of any of aspects 25 through 34.

Aspect 46: A non-transitory computer-readable medium storing code for wireless communications implemented by a base station, the code comprising instructions executable by a processor to perform a method of any of aspects 25 through 34.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, in some cases, a list of at least one of A, B, or C means A or B or C or AB or AC or BC or ABC (i.e., A and B and C). Also, as used herein, the phrase "based on" shall not be construed as a reference to a closed set of conditions. In one aspect, a step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the aspects that may be implemented or that are within the scope of the claims. The term "example" used herein means "serving as an example, instance, or illustration," and not "preferred" or "advantageous over other examples." Further, the term "example" as used herein does not imply separate embodiments; that is, multiple examples, multiple aspects, or both may be combined in any embodiment as described herein. The detailed description includes specific details for the purpose of providing an understanding of the described techniques. These techniques, however, may be practiced without these specific details. In some instances, known structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications implemented by a user equipment (UE), comprising:
   registering, with a network entity, on a first cell supporting a first radio access technology in a frequency spectrum;
   registering, with the network entity, on a second cell supporting a second radio access technology different from the first radio access technology and at least partially overlapping with the first cell in the frequency spectrum based at least in part on the network entity supporting dynamic sharing of the frequency spectrum between the first radio access technology and the second radio access technology;
   receiving, via a control channel for the first radio access technology, a control message indicating a first set of resources in the frequency spectrum for communications using the first radio access technology and a second set of resources in the frequency spectrum for communications using the second radio access technology, wherein the first set of resources and the second set of resources are multiplexed according to a time division multiplexing scheme; and
   communicating with the network entity based at least in part on the registering on the first cell supporting the first radio access technology and the registering on the second cell supporting the second radio access technology.

2. The method of claim 1, further comprising:
   receiving a cell identifier for the first cell, wherein the cell identifier indicates that the network entity supports the dynamic sharing of the frequency spectrum between the first radio access technology and the second radio access technology.

3. The method of claim 1, wherein the communicating comprises:
   performing data communications on the first cell using the first radio access technology; and
   performing, at least partially concurrent to the performing the data communications, voice communications on the second cell using the second radio access technology.

4. The method of claim 1, further comprising:
   establishing a first radio bearer for the communicating with the network entity using the first radio access technology and a second radio bearer for the communicating with the network entity using the second radio access technology.

5. The method of claim 1, further comprising:
   caching, in local memory at the UE, an indication that the network entity supports the dynamic sharing of the frequency spectrum between the first radio access technology and the second radio access technology.

6. The method of claim 1, wherein the control message is received on a primary carrier corresponding to the first radio access technology.

7. The method of claim 1, further comprising:
   using a single radio frequency transceiver to receive the first set of resources and the second set of resources.

8. The method of claim 1, wherein the registering on the first cell supporting the first radio access technology and the registering on the second cell supporting the second radio access technology comprise a dual registration procedure.

9. The method of claim 1, further comprising:
   displaying, in a user interface of the UE, an icon indicating that the UE supports the dynamic sharing of the frequency spectrum between the first radio access technology and the second radio access technology.

10. The method of claim 1, wherein the communicating comprises:
    communicating with the network entity on a first carrier using the first radio access technology based at least in part on the registering on the first cell supporting the first radio access technology; and
    communicating with the network entity on a second carrier using the second radio access technology based at least in part on the registering on the second cell supporting the second radio access technology.

11. The method of claim 10, wherein the first carrier and the second carrier are a same carrier.

12. The method of claim 1, wherein:
the first radio access technology comprises a fifth generation radio technology; and
the second radio access technology comprises a long term evolution technology.

13. A method for wireless communications implemented by a network entity, comprising:
configuring a frequency spectrum for dynamic sharing between a first radio access technology and a second radio access technology;
registering a user equipment (UE) on a first cell supporting the first radio access technology in the frequency spectrum;
registering the UE on a second cell supporting the second radio access technology different from the first radio access technology and at least partially overlapping with the first cell in the frequency spectrum based at least in part on the configuring;
transmitting, via a control channel for the first radio access technology, a control message indicating a first set of resources in the frequency spectrum for communications using the first radio access technology and a second set of resources in the frequency spectrum for communications using the second radio access technology, wherein the first set of resources and the second set of resources are multiplexed according to a time division multiplexing scheme; and
communicating with the UE based at least in part on the registering the UE on the first cell supporting the first radio access technology and the registering the UE on the second cell supporting the second radio access technology.

14. The method of claim 13, further comprising:
transmitting a cell identifier for the first cell, the second cell, or both, wherein the cell identifier is associated with support of the dynamic sharing between the first radio access technology and the second radio access technology, wherein the registering the UE on the second cell supporting the second radio access technology is based at least in part on the cell identifier.

15. The method of claim 13, wherein the communicating comprises:
performing data communications on the first cell using the first radio access technology; and
performing, at least partially concurrent to the performing the data communications, voice communications on the second cell using the second radio access technology.

16. The method of claim 15, further comprising:
directing traffic associated with the voice communications to the second radio access technology based at least in part on the second radio access technology supporting a threshold quality of service for the voice communications.

17. The method of claim 15, further comprising:
maintaining data connectivity using the first radio access technology during the performing the voice communications using the second radio access technology.

18. The method of claim 13, wherein the registering the UE on the first cell supporting the first radio access technology and the registering the UE on the second cell supporting the second radio access technology comprise a dual registration procedure for the UE.

19. The method of claim 13, wherein the communicating comprises:
communicating with the UE on a first carrier using the first radio access technology based at least in part on the registering the UE on the first cell supporting the first radio access technology; and
communicating with the UE on a second carrier using the second radio access technology based at least in part on the registering the UE on the second cell supporting the second radio access technology.

20. The method of claim 19, wherein the first carrier and the second carrier are a same carrier.

21. The method of claim 13, wherein:
the first radio access technology comprises a fifth generation radio technology; and
the second radio access technology comprises a long term evolution technology.

22. An apparatus for wireless communications implemented by a user equipment (UE), comprising:
a processor;
memory coupled with the processor; and
instructions stored in the memory and executable by the processor to cause the apparatus to:
register, with a network entity, on a first cell supporting a first radio access technology in a frequency spectrum;
register, with the network entity, on a second cell supporting a second radio access technology different from the first radio access technology and at least partially overlapping with the first cell in the frequency spectrum based at least in part on the network entity supporting dynamic sharing of the frequency spectrum between the first radio access technology and the second radio access technology;
receive, via a control channel for the first radio access technology, a control message indicating a first set of resources in the frequency spectrum for communications using the first radio access technology and a second set of resources in the frequency spectrum for communications using the second radio access technology, wherein the first set of resources and the second set of resources are multiplexed according to a time division multiplexing scheme; and
communicate with the network entity based at least in part on the registering on the first cell supporting the first radio access technology and the registering on the second cell supporting the second radio access technology.

23. The apparatus of claim 22, wherein the instructions are further executable by the processor to cause the apparatus to receive a cell identifier for the first cell, wherein the cell identifier indicates that the network entity supports the dynamic sharing of the frequency spectrum between the first radio access technology and the second radio access technology.

24. The apparatus of claim 22, wherein the instructions to communicate are further executable by the processor to cause the apparatus to:
perform data communications on the first cell using the first radio access technology; and
perform, at least partially concurrent to the performing the data communications, voice communications on the second cell using the second radio access technology.

25. The apparatus of claim 22, wherein the instructions are further executable by the processor to cause the apparatus to cache, in local memory at the UE, an indication that the network entity supports the dynamic sharing of the frequency spectrum between the first radio access technology and the second radio access technology.

26. An apparatus for wireless communications implemented by a network entity, comprising:
- a processor;
- memory coupled with the processor; and
- instructions stored in the memory and executable by the processor to cause the apparatus to:
  - configure a frequency spectrum for dynamic sharing between a first radio access technology and a second radio access technology;
  - register a user equipment (UE) on a first cell supporting the first radio access technology in the frequency spectrum;
  - register the UE on a second cell supporting the second radio access technology different from the first radio access technology and at least partially overlapping with the first cell in the frequency spectrum based at least in part on the configuring;
  - transmit, via a control channel for the first radio access technology, a control message indicating a first set of resources in the frequency spectrum for communications using the first radio access technology and a second set of resources in the frequency spectrum for communications using the second radio access technology, wherein the first set of resources and the second set of resources are multiplexed according to a time division multiplexing scheme; and
  - communicate with the UE based at least in part on the registering the UE on the first cell supporting the first radio access technology and the registering the UE on the second cell supporting the second radio access technology.

27. The apparatus of claim 26, wherein the instructions are further executable by the processor to cause the apparatus to transmit a cell identifier for the first cell, the second cell, or both, wherein the cell identifier is associated with support of the dynamic sharing between the first radio access technology and the second radio access technology, wherein the registering the UE on the second cell supporting the second radio access technology is based at least in part on the cell identifier.

28. The apparatus of claim 26, wherein the instructions to communicate are further executable by the processor to cause the apparatus to:
- perform data communications on the first cell using the first radio access technology; and
- perform, at least partially concurrent to the performing the data communications, voice communications on the second cell using the second radio access technology.

* * * * *